United States Patent [19]

Sugimori et al.

[11] Patent Number: 5,179,443
[45] Date of Patent: Jan. 12, 1993

[54] MULTIPLEXED SIGNAL TRANSMITTING AND RECEIVING APPARATUS

[75] Inventors: Yoshio Sugimori; Yoshihide Kimata; Seijiro Yasuki; Yoshihiko Ogawa; Kiyoyuki Kawai, all of Tokyo, Japan

[73] Assignees: Nippon Television Network Corp., Tokyo; Kabushiki Kaishi Toshiba, Kawasaki, both of Japan

[21] Appl. No.: 822,880

[22] Filed: Jan. 21, 1992

[30] Foreign Application Priority Data

Jan. 21, 1991 [JP] Japan .................................. 3-20442
Jan. 21, 1991 [JP] Japan .................................. 3-20476

[51] Int. Cl.⁵ .............................................. H04N 7/04
[52] U.S. Cl. ................................... 358/141; 358/142; 358/140; 358/12
[58] Field of Search ............... 358/140, 141, 180, 142, 358/230, 186, 12, 188, 133

[56] References Cited

U.S. PATENT DOCUMENTS 4,845,562  7/1989  Koslov ..................... 358/141
4,979,020  12/1990  Isnardi .................... 358/141
4,985,769  1/1991  Yasumoto ................ 358/142

OTHER PUBLICATIONS

S. Yasuki et al. ITEJ Technical Report, vol. 13, No. 41, pp. 19–24, BCS'89-4; Aug. 31, 1989 "A Study of Multiplexing Technique for Widening Aspect-Ratio".

M. Kageyama et al.; ITEJ Technical Report, vol. 13, No. 41, pp. 37–42, BCS'89-7; Sep. 1, 1989 "A Scheme for Improving Vertical Frequency Characteristics of Letter-Box Method".

Primary Examiner—James J. Groody
Assistant Examiner—Sherrie Hsia
Attorney, Agent, or Firm—Cushman, Darby & Cushman

[57] ABSTRACT

A wide aspect signal is band-width limited in the vertical spatial frequency by a V-LPF. The wide aspect signal is band-width limited along the temporal spatial frequency and in the vertical and horizontal spatial frequency by a 1/60-sec delay unit, an adder, 1 1/60-sec delay unit, a selector, a V-LPF, and an H-LPF. A motion image signal can be obtained by an adder. A still image signal can be obtained by the selector. The motion and still image signals are mixed by a mixer in accordance with an image motion amount. An output from the substractor is processed by a vertical shifter, an H-LPF, and a 6→5 converter to provide a still image compensation signal Vh. A signal from the V-LPF is compressed in the vertical direction by a 6→5 converter so as to be a center portion signal which can be displayed as an image with the receiver of the existing television system, and supplied to a selector. An output signal from the 6→5 converter is processed by an LD generator to generate a motion image compensation signal (LD signal). The LD and Vh signals are selectively output from a mixer in accordance with the image motion. A compensation signal output from the mixer is processed by an H-LPF, a 1/5-time compressor, and a rearranging unit, so that it can be multiplexed on upper and lower black bar portions formed on upper and lower portions of the center panel, and supplied to the selector.

8 Claims, 18 Drawing Sheets

LETTER BOX SCHEME

SIDE PANEL SCHEME

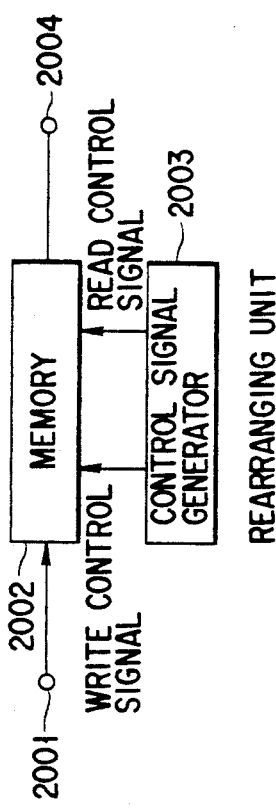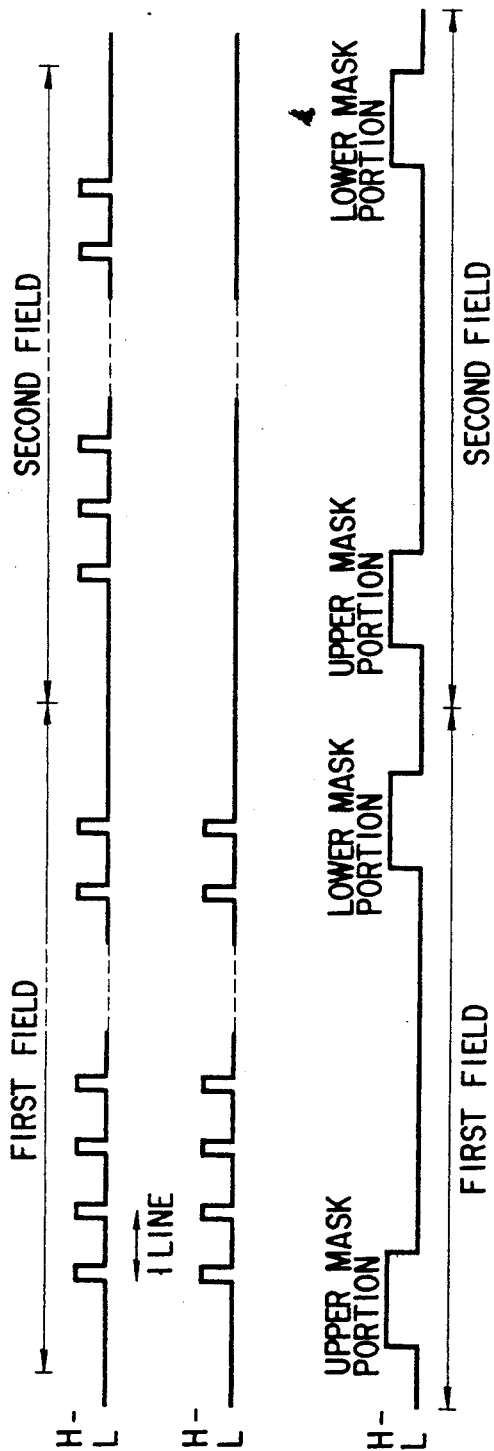

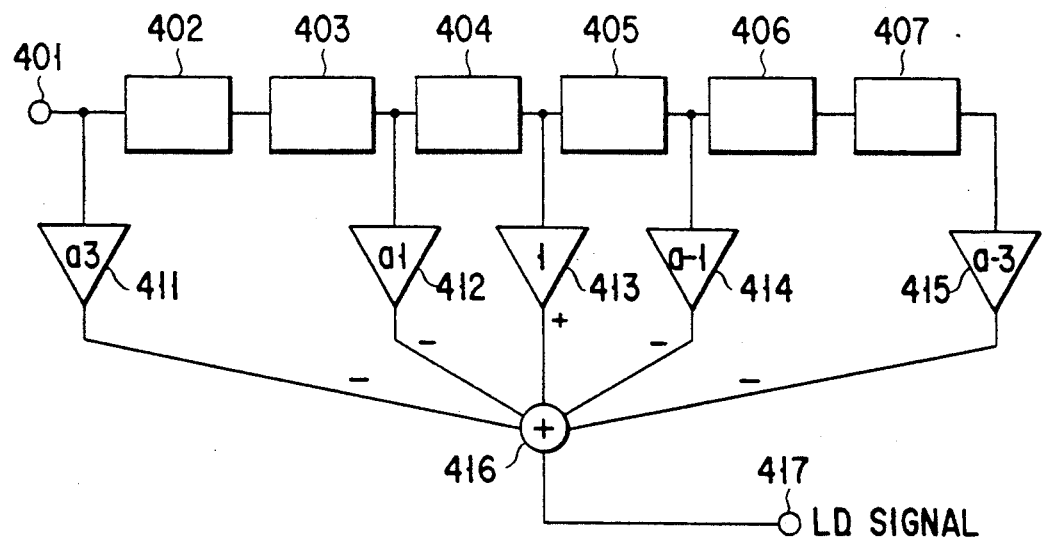
F I G. 16A
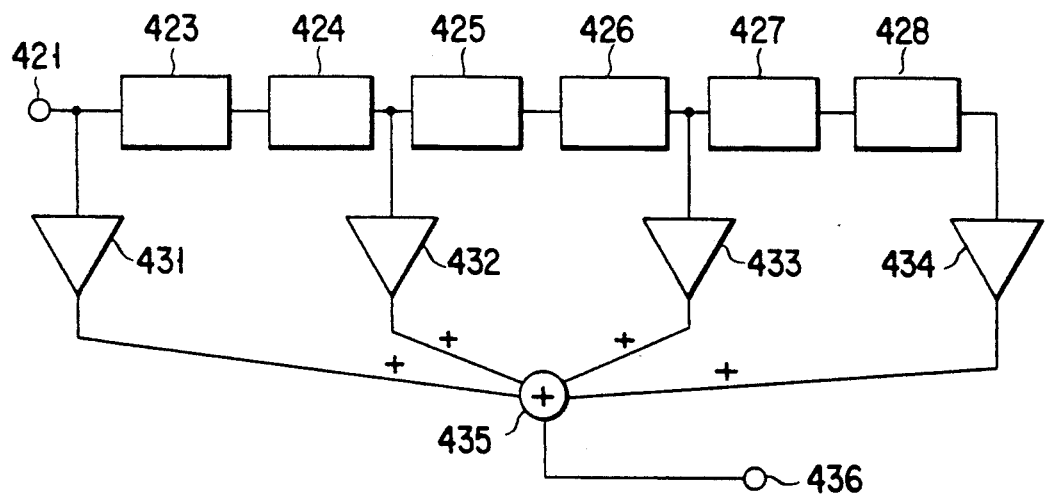
F I G. 16B

MULTIPLEXED SIGNAL TRANSMITTING AND RECEIVING APPARATUS

BACKGROUND OF THE INVENTION

1. Field of the Invention

The present invention relates to a multiplexed signal transmitting and receiving apparatus which can transmit a wide aspect signal for forming a wider screen than a screen obtained by an image signal processed in each existing television system and which has an improved transmission scheme so that the transmission signal can be received and reproduced even by a television receiver of the existing television system.

2. Description of the Related Art

A television system has been recently studied and developed which can transmit a television signal for a wider screen of an aspect ratio (e.g., 16:9) than a screen of an aspect ratio (4:3) obtained by a television signal of the existing television system while maintaining the compatibility with the existing television system.

This wide aspect signal transmission system can be roughly classified into the side panel scheme and the letter box scheme. These two schemes will be described.

The side panel scheme will be described first.

According to the side panel scheme, an image signal for a screen with an aspect ratio of 16:9 is divided into a center panel signal and right and left side panel signals. The center panel signal is time-expanded in the horizontal direction and set to an aspect ratio of 4:3. The side panel signals are time-compressed and multiplexed on a horizontal over-scanning portion or the like. When the image signal encoded in this manner is reproduced with a television receiver of the existing television system, the center panel is displayed on the entire portion of the screen of the aspect ratio of 4:3. In a decoder for a wide aspect signal, the center and side panel signals are subjected to processing opposite to that in encoding. The center and side panel signals are combined and processed so that an image can be displayed on a screen of an aspect ratio of 16:9. Literature describing the side panel scheme includes "Studies on Multiplex Method for Aspect Ratio Increase", Technical Report of Television Society, August 1989, Vol. 13, No. 41, pp. 19-24.

The letter box scheme will be described.

According to the letter box scheme, an image signal for a screen having an aspect ratio of 16:9 is compressed in the vertical direction and processed so that it can be displayed on a screen of an aspect ratio of 4:3. Upper and lower black bar portions are formed in the upper and lower portions of the conventional display screen due to this compression. A high-resolution signal omitted from the center portion signal is multiplexed on the upper and lower black bar portions and can be utilized when a wide aspect signal is to be decoded. Accordingly, in a decoder, the center portion is vertically expanded, and the high-resolution signal multiplexed on the upper and lower black bar portions is reproduced and added to the vertical expanded image signal. Literature describing the letter box scheme includes "One Method of Improving Vertical Frequency Characteristic by Letter Box Scheme", Technical Report of Television Society, September 1989, Vol. 13, No. 41, pp. 37-42.

As described above, when a signal is transmitted and received by using the side panel or letter box scheme, the encoded television signal has compatibility with the existing television system and can thus be received and reproduced by a television receiver of the existing television system. However, both the side panel and letter box schemes have individual problems.

According to the side panel scheme, the side panels which are cut are not displayed on the television receiver of the existing television system. A program material must be considered on a condition that the side panels will be cut. To cut the side panels also poses a problem in terms of the copyright of the program production.

On the other hand, according to the letter box scheme, the entire wide screen can be displayed on the television receiver of the existing television system. In this case, however, the upper and lower black bar portions occupy the screen at a large ratio, and the utilization efficiency of the entire screen is not good.

SUMMARY OF THE INVENTION

It is, therefore, an object of the present invention to provide a multiplexed signal transmitting apparatus of an intermediate scheme which improves the utilization efficiency of the screen by decreasing the compression ratio with which a television signal for a wide screen is vertically compressed in accordance with the letter box scheme and which transmits the television signal by partially cutting signals corresponding to the side panels so that the resultant signal will conform to an aspect ratio of 4:3.

According to this scheme, when an image is observed on a television receiver of the existing television system, the ratio at which the upper and lower black bar portions occupy the screen becomes lower than that of a case in which only the letter box scheme is employed, and the ratio at which the side portions are cut becomes lower than that of a case in which only the side panel scheme is employed, resulting in a scheme as a compromise in which defects of both the side panel and letter box schemes are decreased. Therefore, in accordance with the intermediate scheme, when a wide aspect signal is to be processed, both processing by the letter box scheme and processing by the side panel scheme are employed and combined.

It is another object of the present invention to provide a multiplexed signal transmitting apparatus in which the letter box processing employed by the intermediate scheme is designed such that an augment signal (compensation signal) for reproducing a high-quality image can be sufficiently transmitted and reproduced without causing an interference in the receiver of the existing television system.

It is still another object of the present invention to provide a multiplexed signal receiving apparatus for decoding an image signal transmitted from the multiplexed signal transmitting apparatus to a wide aspect signal.

In order to achieve the above objects, a multiplexed signal transmitting apparatus according to the present invention comprises a letter box encoder for processing a wide aspect signal in accordance with the letter box scheme, and a side panel encoder for receiving and processing, in accordance with the side panel scheme, an output from the letter box encoder.

Furthermore, according to the present invention, the multiplexed signal transmitting apparatus for converting a first image signal for a screen wider than a screen obtained by an existing television signal to a signal which can be reproduced by a receiver of an existing television system and transmitting the converted signal, comprises band width limiting means for obtaining a second image signal by limiting a band of at least a vertical high-frequency component of the first image signal along the temporal spatial frequency, compensation signal generating means for obtaining a difference signal (LD signal) between an interpolated scanning line, obtained by performing interpolation by using a plurality of vertical scanning lines of the second image signal of interlace scan, and a scanning line actually constituting the second image signal and corresponding to the interpolated scanning line, converting means for obtaining a third image signal by conversion of the second image signal such that a first region becomes an image display portion and a second region becomes a non-image portion when the second image signal is compressed in the vertical direction and an image of the compressed signal is matched to a screen of the receiver of the existing television system, and transmitting means for multiplexing the LD signal from the compensation signal generating means on the non-image portion of the third image signal obtained by said converting means and transmitting the multiplexed signal in order to use the multiplexed signal for compensating for an interpolated scanning line of a receiver.

According to the present invention, there is also provided a receiving apparatus for receiving and decoding a transmitted multiplexed signal obtained by converting a first image signal for a screen wider than a screen obtained by an existing television signal to a signal which can be reproduced by a receiver of an existing television system, comprising dividing means for receiving the multiplexed signal and dividing the multiplexed signal to a center portion signal and upper and lower black bar portion signals of the screen, the multiplexed signal being converted such that the compressed second image signal has a center portion as an image display portion and upper and lower black bar portions as non-image portions when a vertical high-frequency component of the first image signal is band-limited along the temporal spatial frequency by a transmission side to obtain a second image signal, the second image signal is converted by compression in the vertical direction, and the compressed signal is matched to the screen of the receiver of the existing television system, the upper and lower black bar portions being multiplexed with a difference signal (LD signal) as a difference between an interpolated scanning line, obtained by performing interpolation by using a plurality of vertical scanning lines of the second image signal, and a scanning line actually constituting the second image signal and corresponding to the interpolated scanning line, compensation signal reproducing means for reproducing the LD signal from the upper and lower black bar portion signals obtained by the dividing means, converting means for double-speed converting a center portion signal obtained by the dividing means, alternately selecting a direct scanning line obtained by double speed conversion of the center portion signal and an interpolated scanning line formed by using the direct scanning line, and outputting a progressive scanning signal, expanding means for expanding a signal obtained by the converting means in the vertical direction by an amount compressed on the transmission side, thereby obtaining an expanded signal, and compensation signal synthesizing means for adding the LD signal reproduced by the compensation signal reproducing means to the interpolated scanning line.

With the above means, since the vertical high-frequency component is band-limited in advance along the temporal spatial frequency, the LD signal (representing a difference between the interpolated scanning signal which will be obtained on the decoder side by interpolation and an original scanning line of an original image corresponding to it) is band-compressed along the temporal spatial frequency and then transmitted. That is, the LD signal can be transmitted every 1/30 sec. but not every 1/60 sec. After band limiting is performed in this manner, no degradation in image quality occurs on the decoder side, which is confirmed by an experiment. Therefore, the LD signal is transmitted every 1/30 sec. and can add information corresponding to 200 to 400 [television scanning lines per picture height], i.e., 200 scanning lines. In the intermediate scheme, each of the upper and lower black bar portions has a multiplex region corresponding to 40 scanning lines. When LD signals corresponding to 200 scanning lines are compressed 1/5 times, they are converted to signals corresponding to 40 scanning lines. Thus, the LD signal can be sufficiently transmitted by either upper or lower black bar portion. Side panel information can be transmitted by the remaining black bar portion. This LD signal compensates for the interpolated scanning line on the decoder side.

Because of the motion adaptive processing, a signal corresponding to 400 [television scanning lines per picture height] is transmitted in the motion image processing mode, and a signal corresponding to 400 [television scanning lines per picture height] to 480 [television scanning lines per picture height] is transmitted in the still image processing mode. Therefore, even if the vertical resolution of the motion image is decreased, substantially no degradation occurs in image quality.

On the decoder side, compensation for the interpolated scanning line is performed by utilizing the LD signal reproduced from the multiplexed signal in the black bars. The position of the interpolated scanning line is different between the first and second fields. For the compensation of the first field, the LD signal reproduced from the black bar portion is used. However, in the second field, the LD signal is regenerated from a signal converted to a progressive scanning signal on the decoder side and used for compensating for the interpolated scanning line of the second field.

BRIEF DESCRIPTION OF THE DRAWINGS

FIG. 9 is a block diagram showing an arrangement of a rearranging unit shown in FIG. 8;

FIGS. 10A to 10C are timing charts for explaining the operation of the circuit of FIG. 9;

FIG. 16A is a circuit diagram showing an arrangement of an LD signal generator used in the apparatus of the present invention, and FIG. 16B is a circuit diagram showing an arrangement of a scanning line interpolator used in the apparatus of the present invention;

DETAILED DESCRIPTION OF THE PREFERRED EMBODIMENTS

Prior to the explanation of the practical embodiments of the present invention, systems for realizing the side panel, letter box, and intermediate schemes, respectively, will be described.

Figure 1B:
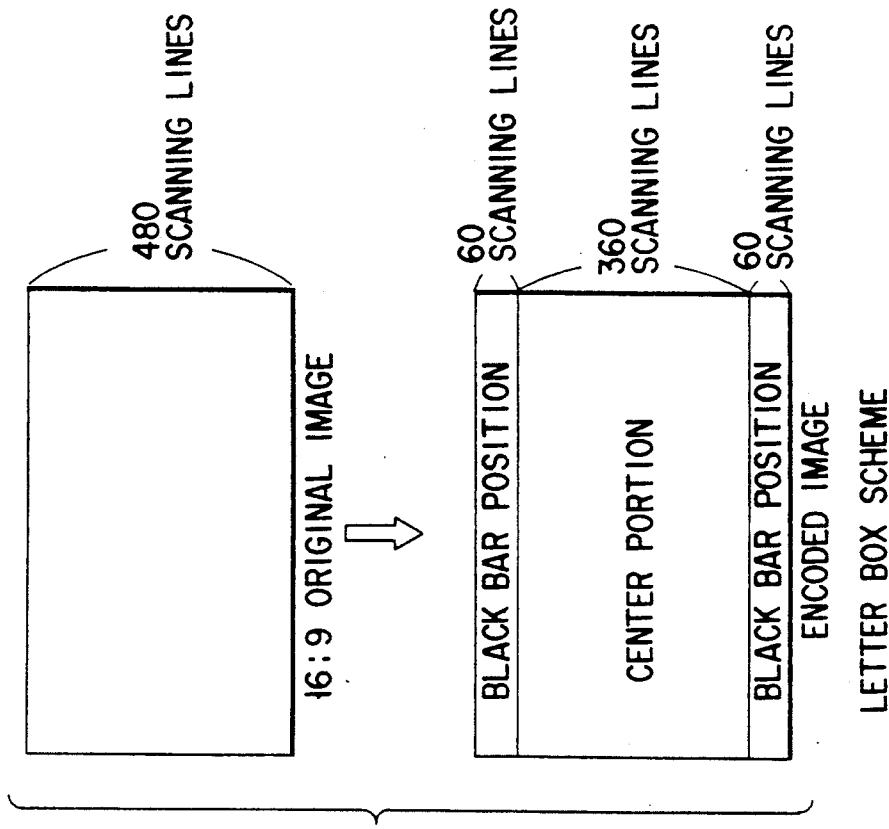
FIGS. 1A and 1B are diagrams for explaining the side panel and letter box schemes, respectively.
Figure 1A:
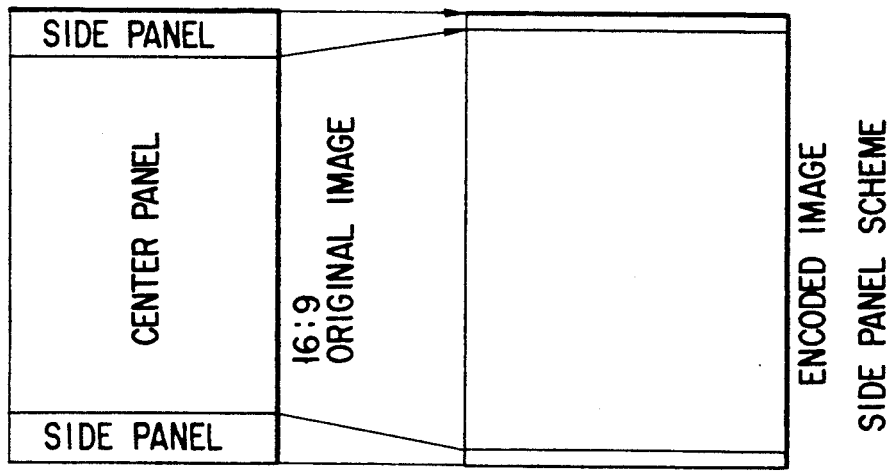

In FIG. 1A, an image signal for a screen of an aspect ratio of 16:9 is divided into a center panel signal and right and left side panel signals in accordance with the side panel scheme. The center panel signal is time-expanded in the horizontal direction and set to have an aspect ratio of 4:3. The side panel signals are time-compressed. The time-compressed side panel signals are multiplexed on the horizontal overscanning portions.

In FIG. 1B, an image signal for a screen of the aspect ratio of 16:9 is vertically compressed and processed in accordance with the letter box scheme so that it is fitted within a screen of the aspect ratio of 4:3. Upper and lower black bar portions are formed in the upper and lower black bar portions of the screen because of the compression. A high-resolution image signal omitted from the center portion by compression is multiplexed on the upper and lower black bar portions and can be utilized when a wide aspect signal is to be decoded. Accordingly, in the decoder, the center portion is vertically expanded, and the high-resolution image signal multiplexed on the upper and lower black bar portions is reproduced and added to the expanded image signal.

Figure 2A:
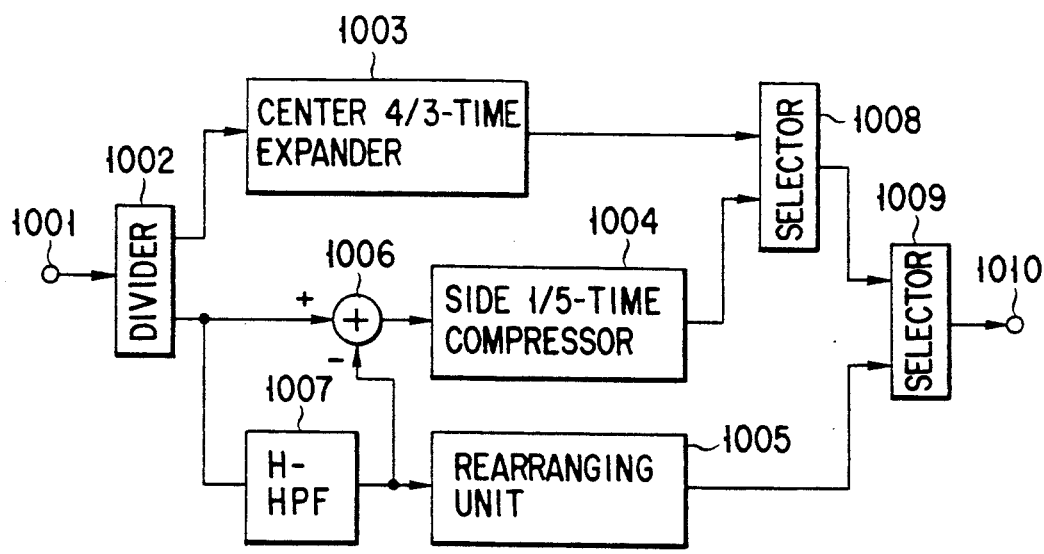
FIGS. 2A and 2B are block diagrams showing an encoder and a decoder, respectively, of the side panel scheme.

FIG. 2A shows an encoder of the side panel scheme. A wide aspect signal supplied to an input terminal 1001 is divided into a center panel signal and side panel signals by a divider 1002. The center panel signal is time-expanded by a 4/3-time expander 1003 and converted to an image signal which is free from distortion when displayed on a television screen of the existing television system. Each side panel signal is input to a horizontal high-pass filter (H HPF) 1007 and a subtracter 1006. The subtracter 1006 also receives an output from the horizontal high-pass filter 1007. Accordingly, a horizontal low-frequency component can be obtained by the subtracter 1006. The horizontal low-frequency component is input to a 1/5-time compressor 1004 and time-compressed so that it is located at a horizontal over-scanning portion of the television signal of the existing television system. Outputs from the 1/5-time compressor 1004 and the 4/3-time expander 1003 are input to a selector 1008. During a time period corresponding to an effective display area, the selector 1008 selects a signal corresponding to the center panel, and during a time period corresponding to a horizontal over-scanning portion, it selects a side panel signal. An output from the selector 1008 is input to a selector 1009. The horizontal high-frequency component described above is rearranged so that it can be multiplexed on the vertical over-scanning portion, and is also input to the selector 1009. This rearrangement is performed by a rearranging unit 1005. Therefore, during a time period corresponding to a vertical overscanning portion, the selector 1009 selects an output from the rearranging unit 1005, and during a time period other than that, it selects an output from the selector 1008 and outputs it to an output terminal 1010.

Figure 2B:
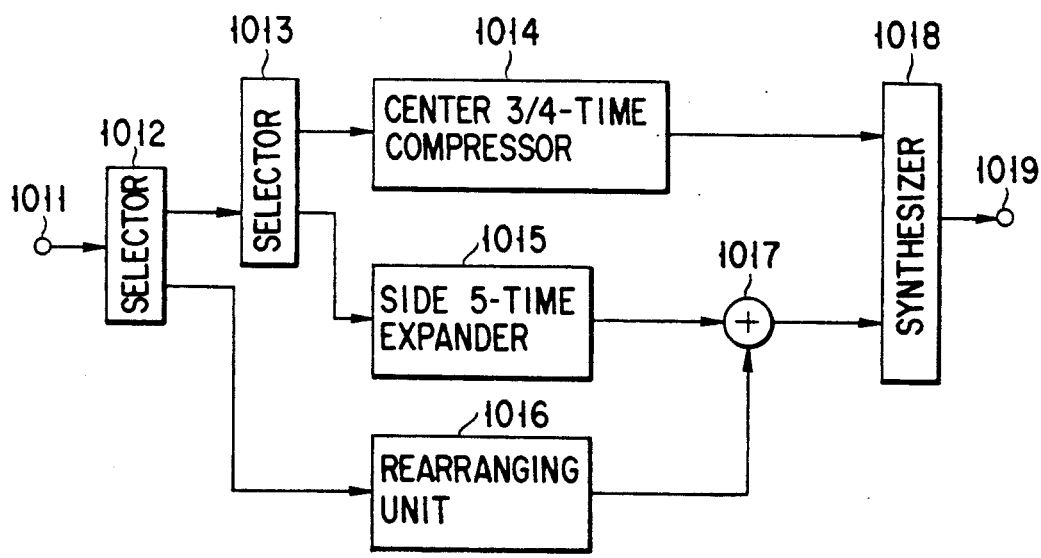

FIG. 2B shows a decoder of the side panel scheme. The image signal processed in the above manner and having compatibility with the existing television system is input to an input terminal 1011. This image signal is divided into a signal corresponding to the vertical over-scanning portion and a signal other than that by a selector 1012. The vertical over-scanning signal is input to a rearranging unit 1016 and rearranged to have the original order. Other signals are input to a selector 1013. The selector 1013 separates a horizontal over-scanning signal from other signals. The horizontal over-scanning signal output from the selector 1013 is input to a 5-time expander 1015, expanded 5 times in the horizontal direction, and input to an adder 1017. Thus, the high- and low-frequency components of the side panels are synthesized by the adder 1017. The signals other than the horizontal over-scanning signal are input to a 3/4-time compressor 1014 and then supplied to a synthesizer 1018. The synthesizer 1018 also receives a signal from the adder 1017. The synthesizer 1018 decodes a wide aspect signal and supplies it to an output terminal 1019.

The letter box scheme will be described.

Figures 3A, 3B:
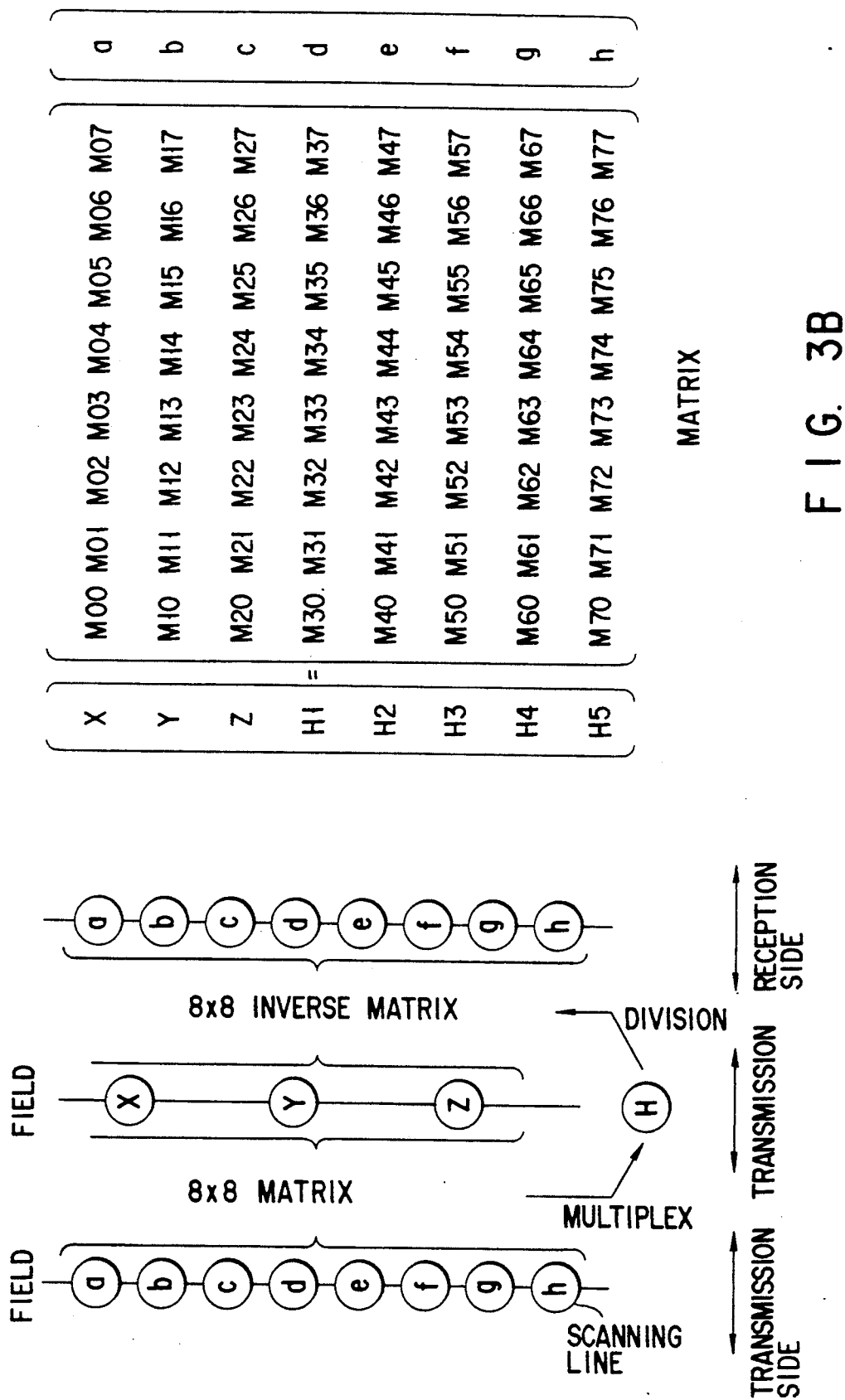
FIG. 3A is a diagram for explaining the principle of vertical compression and expansion of the letter box scheme.
FIG. 3B is a diagram showing a matrix used for vertical compression processing.

FIGS. 3A and 3B are explanatory diagrams for realizing the letter box scheme. Assume that an original image signal for a screen with an aspect ratio 16:9 has 480 [progressive scanning lines per picture height]. In order to display an image on a screen with an aspect ratio of 4:3 without any graphical distortion, the image must be compressed 3/4 times in the vertical direction to obtain 360 [television scanning lines per picture height]. In order to receive and display the image by a television receiver of the existing television system, the signal must be interlaced. Then, the signal must be converted to have 180 [television scanning lines per picture height] per field.

In the letter box processing, a signal of 480 [progressive scanning lines per picture height] is subjected to a matrix calculation in units of 8 scanning lines. Of the resultant scanning lines, 3 scanning lines are multiplexed on the center portion and the remaining 5 scanning lines are multiplexed on the upper and lower black bar portions. Accordingly, a signal having 480 [progressive scanning lines per picture height] per 1/60 sec. is converted to a vertically compressed signal, i.e., an interlaced signal having 180 [television scanning lines per picture height] per 1/60 sec. FIG. 3B shows a matrix. When a matrix calculation of 8×8 is to be performed, the signal can be converted to one having compatibility with the existing receiver by appropriately selecting the coefficient. Regarding the five multiplexed signals (300 [television scanning lines per picture height]) multiplexed on the upper and lower black bar portions, their horizontal band is limited to 0.8 MHz to perform 1/5-time compression, so that they are multiplexed and transmitted to an area having 60 scanning lines per 1/60 sec.

Figure 4:
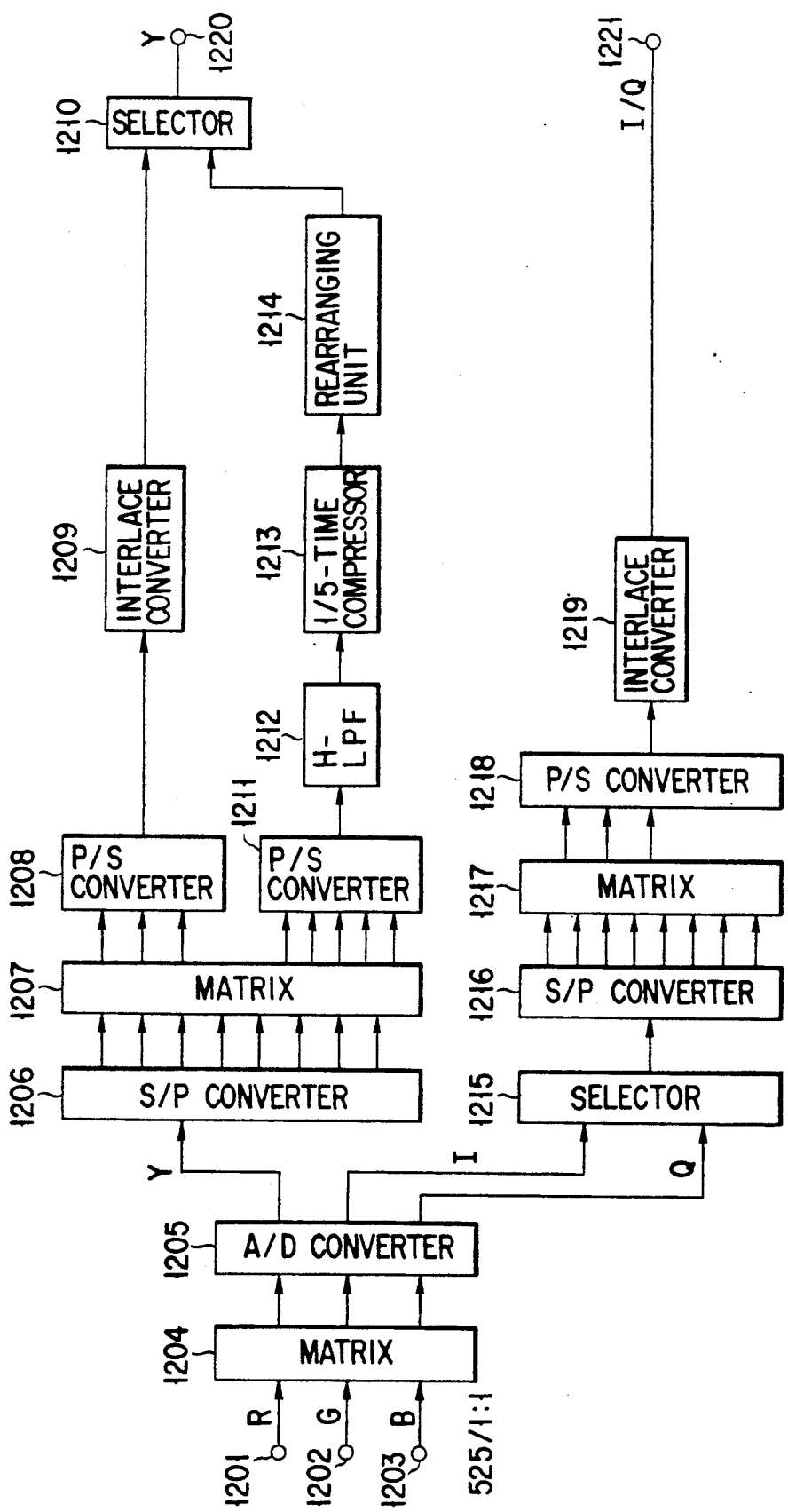
FIG. 4 is a block diagram showing an encoder of the letter box scheme.

FIG. 4 shows an encoder for realizing the letter box scheme described above. R, G, and B signals from a camera or the like are input to input terminals 1201, 1202, and 1203. These signals are progressive scanning signals for a screen with an aspect ratio of 16:9 and having 480 [television scanning lines per picture height]. The R, G, and B signals are supplied to a matrix circuit 1204, converted to a luminance signal Y, an I signal, and a Q signal, and input to an analog-to-digital (A/D) converter 1205. The digital luminance signal Y is supplied to a serial-to-parallel (S/P) converter 1206. The I and Q signals are supplied to a selector 1215 which performs selection in units of pixels. The S/P selector 1206 outputs 8 scanning line signals in a parallel manner to a matrix circuit 1207 so that they are subjected to matrix calculation. Of the obtained calculation result, 3 signals are supplied to a parallel-to-serial (P/S) converter 1208 in a parallel manner to be series-converted, and output as center portion signals. The remaining 5 signals are supplied to a P/S converter 1211, series converted, and band-limited to 0.8 MHz by a horizontal low-pass filter (H-LPF) 1212. The band-limited signals are input to a 1/5-time compressor 1213, time-compressed 1/5 times, and input to a rearranging unit 1214 so that they can be multiplexed on the upper and lower black bar portions. A 1/5-time compression of a 0.8 MHz signal provides a signal of 0.8 MHz×5=4 MHz, which is a frequency that can be transmitted with the television signal band of the existing television system. The center portion signals are converted to interlaced signals by an interlace converter 1209 and supplied to a selector 1210. During a time period corresponding to the upper and lower black bar portions, the selector 1210 selects an output from the rearranging unit 1214, and during a time period corresponding to the center panel, it selects a signal from the interlace converter 1209 and supplies it to an output terminal 1220.

The I and Q signals form a time-division multiplexed signal by the selector 1215. The signal is then input to an S/P converter 1216, converted to 8 parallel signals, and input to a matrix circuit 1217. A matrix calculation similar to that performed for the luminance signal is performed. Of the outputs from the matrix circuit 1217, 3 signals are input to a P/S converter 1218, converted to serial signals and input to a converter 1219 to be interlaced. The interlaced I and Q signals are supplied to an output terminal 1221.

Figure 5:
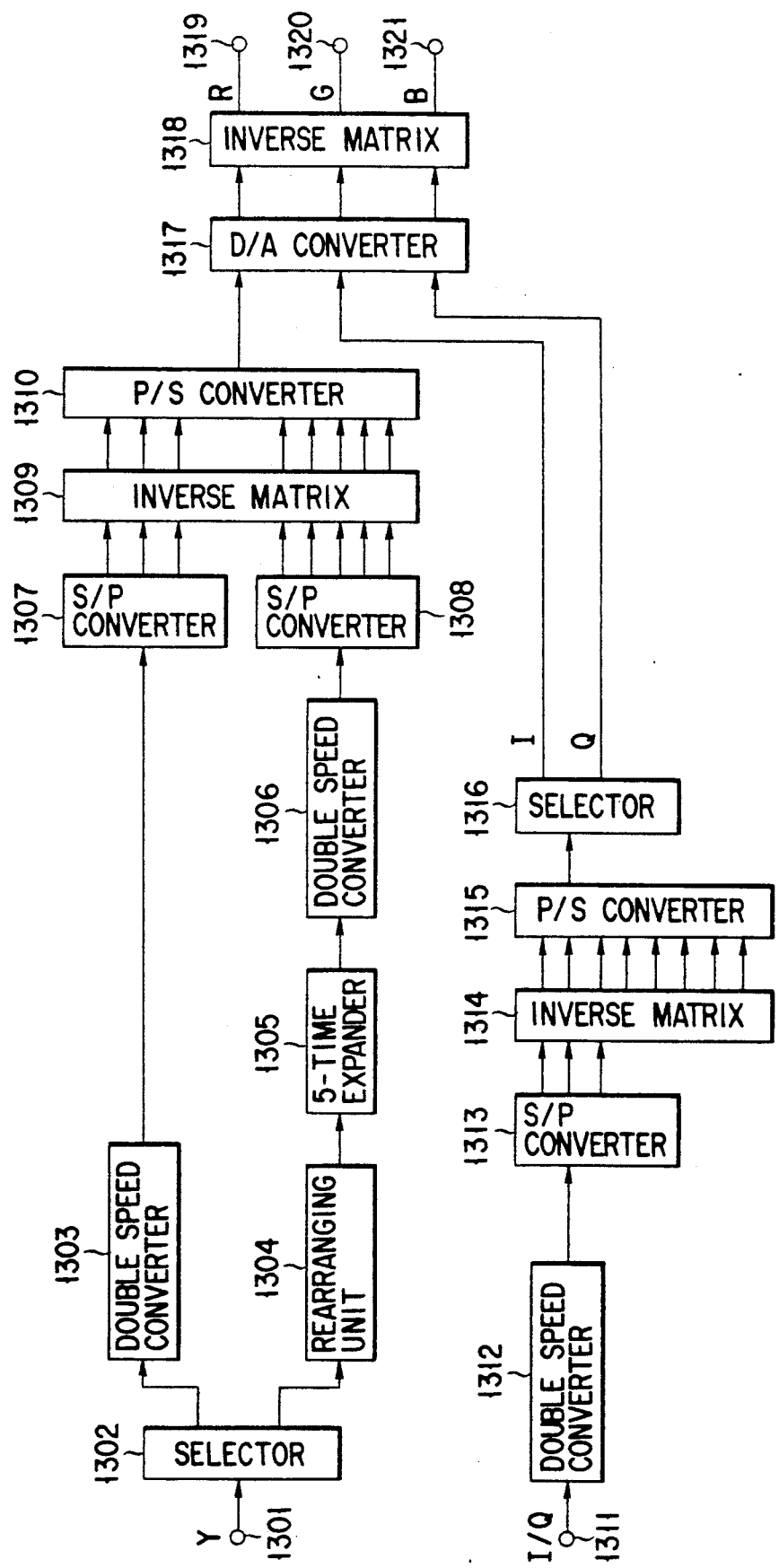
FIG. 5 is a block diagram showing a decoder of the letter box scheme.

FIG. 5 shows a decoder for decoding the image signal transmitted in the above manner to a wide aspect signal. The luminance signal Y is input to an input terminal 1301, and the I and Q signals are input to an input terminal 1311. The luminance signal Y is input to a selector 1302 and divided into a center portion signal and upper and lower black bar portion signals. The center portion signal is input to a double speed converter 1303, converted to a progressive scanning signal, and input to an S/P converter 1307 to be converted to 3 signals. An output from the S/P converter 1307 is input to an inverse matrix circuit 1309. The upper and lower black bar portion signals output from the selector 1302 are input to a rearranging unit 1304 to be rearranged in a manner reverse to that on the transmission side, and input to a 5-time expander 1305. An output from the 5-time expander 1305 is double-speed converted by a double-speed converter 1306, input to an S/P converter 1308 to be converted to 5 signals, and input to the inverse matrix circuit 1309. The 8 signals input to the inverse matrix circuit 1309 are subjected to a matrix calculation inverse to that performed on the transmission side and input to a P/S converter 1310. Thus, a wide aspect signal (having 480 [television scanning lines per picture height]) can be obtained by the P/S converter 1310. Meanwhile, the I and Q signals input to the input terminal 1311 are input to a double-speed converter 1312 to be double-speed converted and input to an S/P converter 1313. A parallel signal is input to an inverse matrix circuit 1314 to be inversely matrix-converted in the same manner as the luminance signal. Since 3 signals are input, e.g., 0 signals are utilized among the remaining 5 signals. Signals obtained by the inverse matrix circuit 1314 are input to a P/S converter 1315, thereby obtaining wide aspect I and Q signals. These I and Q signals are time-division multiplexed as they are processed on the transmission side. Therefore, an output from the converter 1315 is input to a selector 1316 to be separated, and input to a D/A converter 1317. The D/A converter 1317 also receives the luminance signal from the P/S converter 1310. The luminance signal and the I and Q signals output from the D/A converter 1317 are input to an inverse matrix circuit 1318 and converted to the R, G, and B signals. The R, G, and B signals are supplied to output terminals 1319, 1320, and 1321.

The intermediate scheme will be described.

Figure 6:
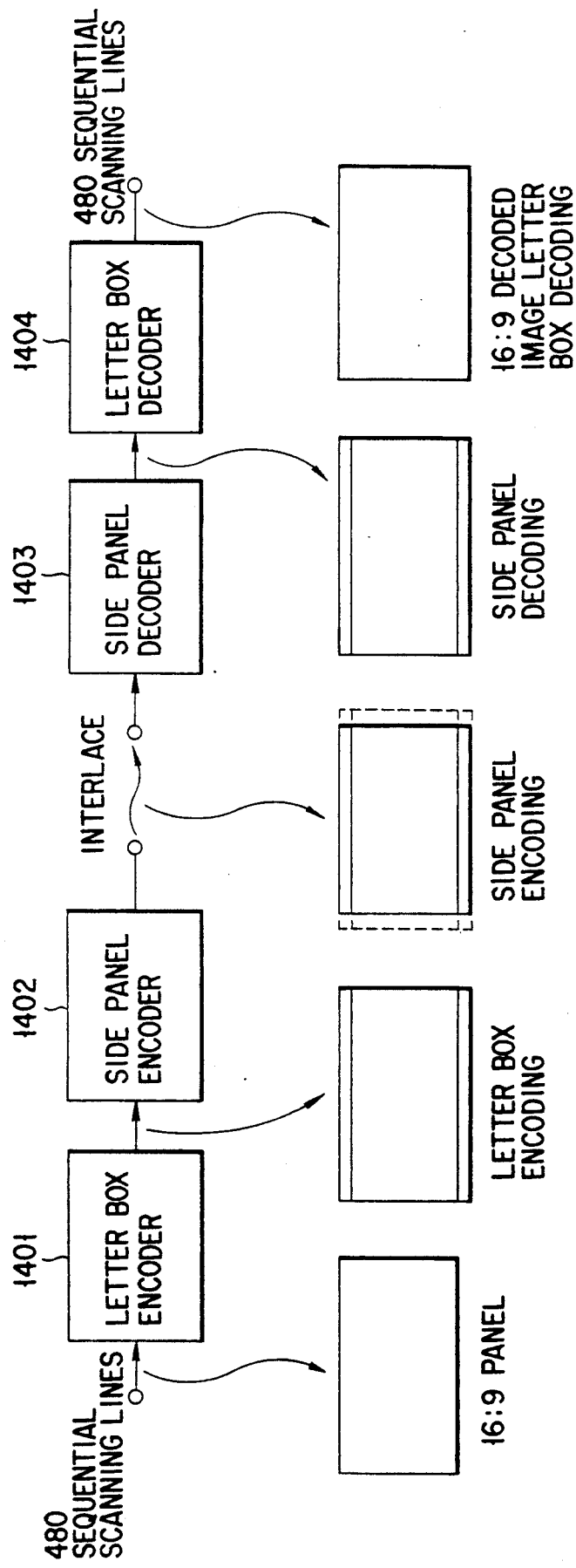
FIG. 6 is a diagram for explaining a signal processing line of the intermediate scheme by way of blocks.

FIG. 6 shows the processing lines of the encoder and the decoder in accordance with the intermediate scheme. A main progressive scanning signal for a screen of an aspect ratio of 16:9 and having 480 scanning lines is first input to a letter box encoder 1401 to be vertically compressed, input to a side panel encoder 1402 to be horizontally expanded, and transmitted. On the decoder side, decoding in accordance with the side panel scheme is performed by a side panel decoder 1403, and vertical expansion in accordance with the letter box scheme is performed by a letter box decoder 1404. As a result, the wide aspect progressive scanning signal for the screen having the aspect ratio of 16:9 and having 480 scanning lines can be transmitted while maintaining the compatibility with the existing television system, and the wide aspect signal can be reproduced on the reception side.

Figure 7:
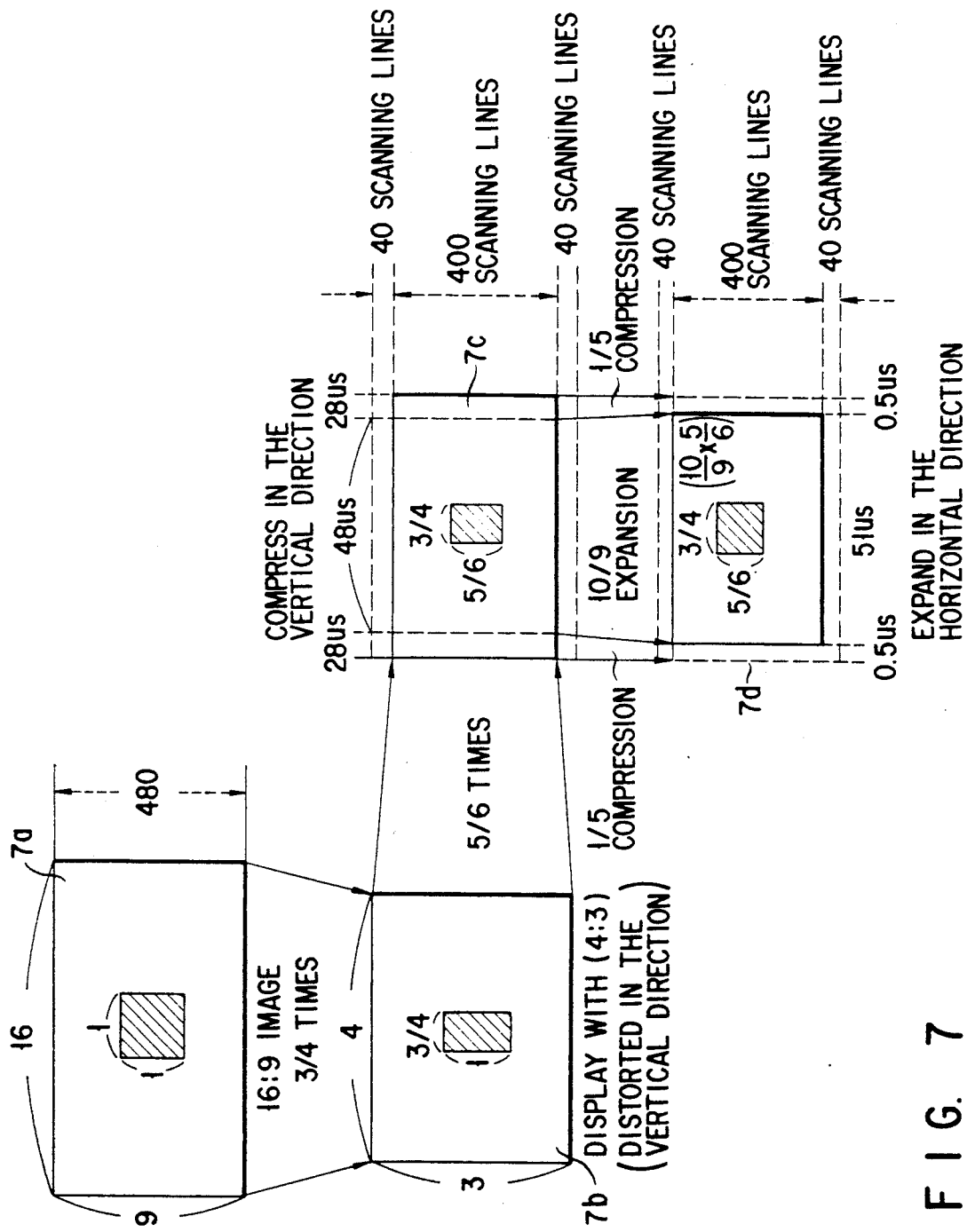
FIG. 7 is a diagram showing transition of screen processing of the intermediate scheme by schematical screens.

FIG. 7 shows transition of the screen which is processed in accordance with the intermediate scheme described above. When an image having an aspect ratio of 16:9 shown on a screen 7a is displayed on a screen of an aspect ratio of 4:3, it will be vertically elongated as indicated by a screen 7b. The image is vertically compressed 5/6 times in accordance with the letter box scheme to obtain a screen 7c. Then, the image is horizontally expanded 10/9 times in accordance with the side panel scheme to obtain a screen 7d, thereby obtaining an image without distortion. In this case, as a result of processing by the letter box scheme, the wide aspect signal having 480 [television scanning lines per picture height] is converted to a center portion signal having 400 [television scanning lines per picture height] and upper and lower black bar portion signals each having 40 [television scanning lines per picture height]. In contrast to this, when a system is to be constructed in accordance with only the letter box scheme, the resultant center portion signal has 360 [television scanning lines per picture height]and each of the resultant upper and lower black bar portion signals has 60 [television scanning lines per picture height]. Therefore, when the intermediate scheme is employed, the number of the scanning lines in each of the upper and lower black bar portions is decreased by 20 scanning lines, and the number of scanning lines in the center portion is increased by 20 scanning lines at each of the upper and lower portions thereof. In other words, the image at the center panel occupies the screen of the aspect ratio of 4:3 within an increased ratio. When this signal is further processed in accordance with the side panel scheme, the ratio of the side panels to be cut can be decreased.

In fine, in the intermediate scheme, the compression rate of the vertical compression of a wide-screen television signal in accordance with the letter box scheme is decreased to effectively use the screen, and the side portions are slightly cut to conform to the aspect ratio of 4:3, thereby performing transmission. In accordance with this scheme, when an image is displayed on the television receiver of the existing television system, the upper and lower black bar portions occupy the screen with a lower ratio than that when only the side panel scheme is employed, and the ratio at which the side portions are cut can be smaller than that of a case which employs only the side panel scheme. Therefore, the defects of the conventional letter box and side panel schemes are decreased to reach a compromise.

The intermediate scheme described above still has points to be improved. These points will be described.

Regarding the processing in accordance with the side panel scheme, the side panels processed in accordance with the intermediate scheme are much narrower than those processed by a system which employs only the side panel scheme. Therefore, the side panel processing system shown in FIGS. 2A and 2B can be easily incorporated in the system of the intermediate scheme by changing its parameters. For example, in FIGS. 2A and 2B, the center panel expansion and compression ratios are 4/3 and 3/4 times, respectively. However, they can be changed to 10/9 and 9/10 times, respectively, in the intermediate scheme, while maintaining the side panel expansion and compression ratios at 5 and 1/5 times, respectively, as in FIGS. 2A and 2B. Regarding the high-frequency component processed in accordance with the side panel scheme, the upper and lower panel black bar portions and vertical over-scanning portion can be used for this purpose.

Regarding the processing in accordance with the letter box scheme, in the intermediate scheme, the number of scanning lines of the main center portion signal is increased to 400 [television scanning lines per picture height] when compared to 360 [television scanning lines per picture height] obtained by the system shown in FIG. 4 which employs only the letter box scheme. In addition, the number of scanning lines at each of the upper and lower black bar portions is decreased from 60 to 40 [television scanning lines per picture height]. This means that in spite that the number of signals to be multiplexed is increased, an area that can be multiplexed is narrowed.

Therefore, it is difficult to directly employ the encoder and decoder shown in FIGS. 4 and 5, respectively, as the letter box-scheme encoder and decoder of the intermediate scheme.

If scanning line count conversion from 480 [television scanning lines per picture height] to 360 [television scanning lines per picture height] by the system employing only the letter box scheme is simply altered to scanning line count conversion of from 480 [television scanning lines per picture height] to 400 [television scanning lines per picture height], the following problems will arise.

In the system employing only the letter box scheme, a signal having 480 scanning lines per 1/60 sec. is matrix-converted into a main signal having 180 scanning lines per 1/60 sec. and upper and lower black bar portion signals having a total of 300 scanning lines per 1/60 sec. The signal having 300 scanning lines per 1/60 sec. is compressed 1/5 times to obtain a signal having 60 scanning lines per 1/60 sec. so that it is multiplexed on the upper and lower black bar portions. As a result, a signal having a total of 240 scanning lines per 1/60 sec. including the main signal having 180 scanning lines per 1/60 sec. is generated and transmitted.

In the intermediate scheme, however, the signal having 480 scanning lines per 1/60 sec. is matrixconverted to a main signal having 200 scanning lines per 1/60 sec. and upper and lower black bar portion signals having a total of 240 scanning lines per 1/60 sec. The signals having a total of 240 scanning lines per 1/60 sec. are compressed 1/5 times to obtain signals having a total of 48 scanning lines per 1/60 sec. Therefore, the resultant signal includes a total of 48 scanning lines per 1/60 sec. at upper and lower black bar portions and 200 scanning lines per 1/60 sec. at the center panel. This signal capacity (248 scanning lines per 1/60 sec.) is larger than that of 240 scanning lines per 1/60 sec. Also, when multiplex areas for the side panels are to be reserved in the upper and lower black bar portions, the multiplex areas of the upper and lower black bar portions become short.

In the system shown in FIGS. 4 and 5 which employs only the letter box scheme, block matrix calculation is performed in units of 8 lines. For this reason, if a transition point of an image exists at the boundary of adjacent ones of the 8-line blocks, an image distortion in units of blocks occurs. In the intermediate scheme, since the center portion is enlarged and displayed, the image graphical distortion in u its of blocks stands out, resulting in a drawback when displayed on the screen of the receiver of the existing television system.

Therefore, in the following embodiment to be described hereinafter, the letter box processing employed by the intermediate scheme is improved so that an augment signal for reproducing a high-quality image can be sufficiently transmitted and reproduced without causing an interference in the receiver of the existing television system.

Figure 8:
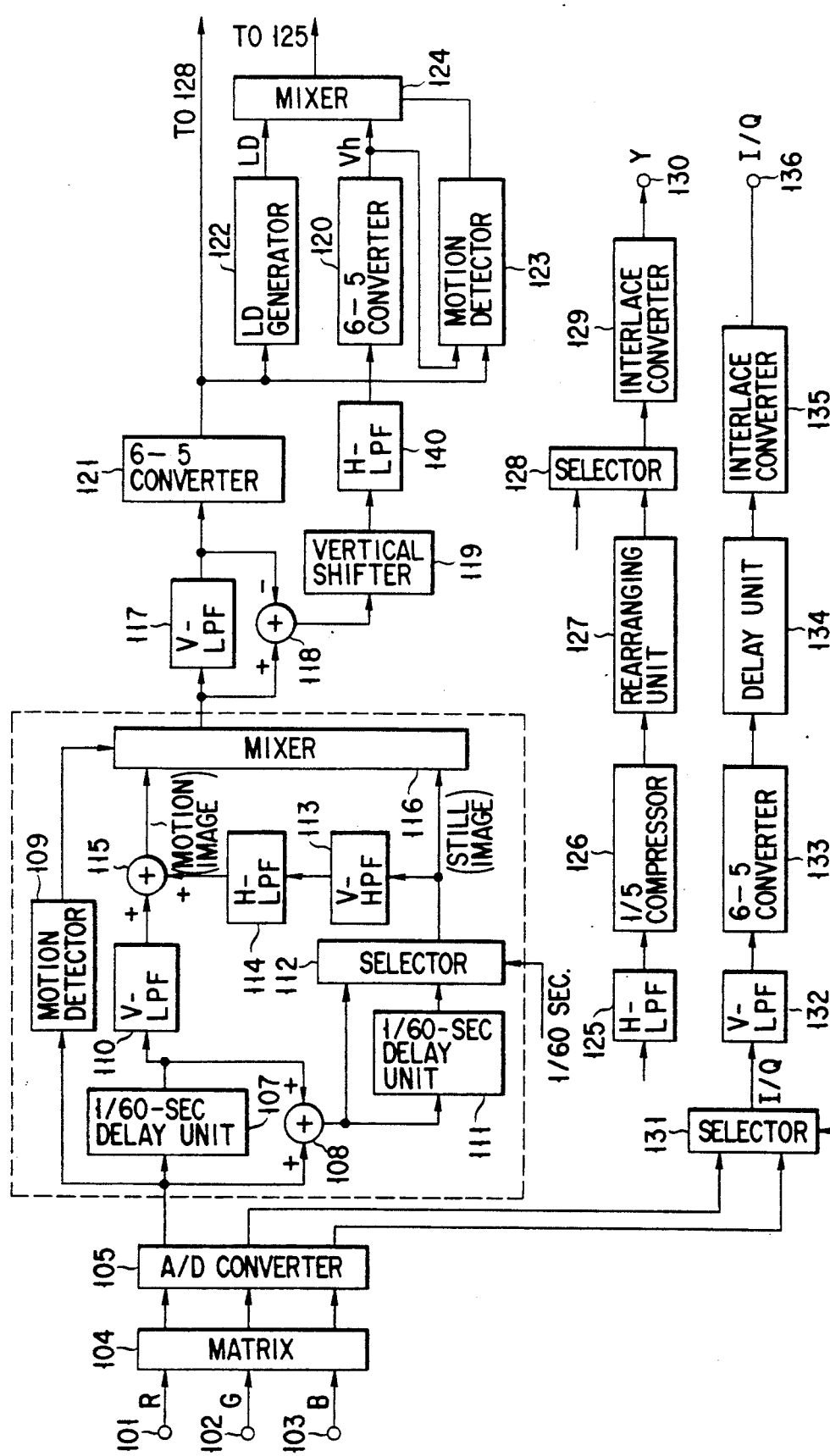
FIG. 8 is a block diagram showing a multiplexed signal transmitting apparatus according to an embodiment of the present invention.

FIG. 8 shows an encoder employing the improved intermediate scheme. Input terminals 101, 102, and 103 receive R, G, and B signals from a camera or the like. The input signals are progressive scanning image signals for a screen with an aspect ratio of 16:9 and having 480 active lines. The R, G, and B signals are converted to a luminance signal Y, an I signal, and a Q signal by a matrix circuit 104. The obtained luminance signal Y and the I and Q signals are digitalized by an A/D converter 105. The digital luminance signal Y is input to a 1/60-sec delay unit 107, an adder 108, and a motion detector 109.

The adder 108 adds input and output luminance signals to and from the 1/60-sec delay unit 107 to average them. That is, the adder 108 obtains an interframe average of the progressive scanning signal and limits its band width along the temporal spatial frequency. An output from the adder 108 is input to one input terminal of a selector 112 and to the other input terminal thereof via a 1/60-sec delay unit 111. The selector 112 selects one of the input signals at its two input terminals every 1/60 sec. and supplies the selected signal to a mixer 116 as a still image signal. The output from the selector 112 is also supplied to a vertical high-pass filter (V-HPF) 113. An output from the V-HPF 113 is input to a horizontal low-pass filter (H-LPF) 114. An output (vertical high-frequency component (200 to 400 [television scanning lines per picture height]) and horizontal low-frequency component (0.8 MHz or less)) from the H-LPF 114 is input to an adder 115.

The output from the 1/60-sec delay unit 107 is also supplied to a vertical low-pass filter (V-LPF) 110. The V-LPF 110 limits an input image signal to a band width corresponding to 200 [television scanning lines per picture height] or less. An output from the V-LPF 110 is input to the adder 115. The adder 115 adds a signal from the V-LPF 110 to a signal from the H-LPF 114. An output from the adder 115 is input to the mixer 116 as a motion image signal. The mixer 116 changes a mixing ratio of the input still and motion image signals i accordance with a motion detection signal output from the motion detector 109. For a motion image portion, the ratio of the motion image signal is increased; for a still image portion, the ratio of the still image signal is increased.

An output from the mixer 116 is supplied to a V-LPF 117 and a subtracter 118. The subtracter 118 subtracts an output signal from the V-LPF 117 from the input signal to it and thus outputs a vertical high-frequency component (corresponding to 400 [television scanning lines per picture height] or more). An output (limited to 400 [television scanning lines per picture height] or less) from the V-LPF 117 is input to a 6→5 converter 121. The 6→5 converter 121 compresses the number of scanning lines 5/6 times in the vertical direction. As a result, the signal having 480 active line is converted to a signal having 400 active lines. An output from the 6→5 converter 121 is input to a selector 128, an LD generator 122, and a motion detector 123. The LD generator 122 generates a difference signal representing a difference between the interpolated scanning lines which interpolate decimated the interlace scanning lines and the original progressive scanning lines. An output from the LD generator 122 is input to a mixer 124. The significance of the LD generator 122 will be described later.

An output from the subtracter 118 is input to a vertical shifter 119 so that it is shifted from a frequency range of 400 to 480 [television scanning lines per picture height] to that of 0 to 80 [television scanning lines per picture height]. An output from the vertical shifter 119 is input to a horizontal low-pass filter (H-LPF) 140, band-limited to 0.8 MHz or less, and input to a 6→5 converter 120. The 6→5 converter 120 compresses an input signal 5/6 times in the vertical direction and outputs it as a still image multiplexed signal (to be referred to as a Vh signal hereinafter) to the mixer 124. The output from the 6→5 converter 120 is also supplied to the motion detector 123. The mixer 124 performs gain control and selection of one of the two input signals in accordance with the motion detection signal from the motion detector 12 and outputs the result. Motion control by the motion detector 123 will be described later.

An output from the mixer 124 is input to an H-LPF 125, band-limited to 0.8 MHz or less, and then compressed by a 1/5-time compressor 126. The compressed signal is rearranged by an rearranging unit 127 in order to correspond to the upper and lower black bar portions, and supplied to a selector 128. For the center portion, the selector 128 selects a signal from the 6→5 converter 121, and for the upper and lower black bar portions, it selects a signal from the rearranging unit 127. Then, the selector 128 supplies the selected signal to an interlace selector 129. The interlace selector 129 converts the progressive scanning signal to an interlaced signal and outputs it at an output terminal 130.

The rearranging unit 127 will be described.

FIG. 9 shows the rearranging unit 127. A signal input at an input terminal 2001 is stored in a memory 2002. The write operation to the memory 2002 is controlled by a write control signal output from a control signal generator 2003. The read operation from the memory 2002 is controlled by a read control signal output from the control signal generator 2003.

FIGS. 10A to 10C are timing charts for explaining the operation of the memory 2002. FIG. 10A shows a signal input to the rearranging unit 127. Reference symbol H denotes a period during which the signal is high. Since a signal during the signal period H has been subjected to 6→5 conversion, it has 400 [television scanning lines per picture height] per field (1/60 sec.). Since this signal has been compressed 1/5 times, its signal period per scanning line is 1/5 that the original signal. This signal processing is performed only for a 1-field signal per frame. Accordingly, the write control signal output from the control signal generator 2003 is as shown in FIG. 10B. The write operation of the memory 2002 is performed when the write control signal is high level. The read operation from the memory 2002 is performed by the read control signal shown in FIG. 10C. The read control signal is at H level only at signal portions corresponding to the upper and lower black bar portions. By the above processing, the rearranging unit 127 rearranges the 1-field compensation signal per frame between the upper and lower black bar portions and outputs it.

The I and Q signals from the A/D converter 105 are time-division multiplexed by a selector 131 and band-limited by a V-LPF 132 in the vertical direction. An output signal from the V-LPF 132 is compressed by a 6→5 converter 133 in the vertical direction and input to an interlace converter 135 via a delay unit 134 for obtaining a synchronism with the luminance signal. The interlaced I/Q signal is output at an output terminal 136.

The operation of the portion of FIG. 8 surrounded by a broken line will be described.

Figure 11A:
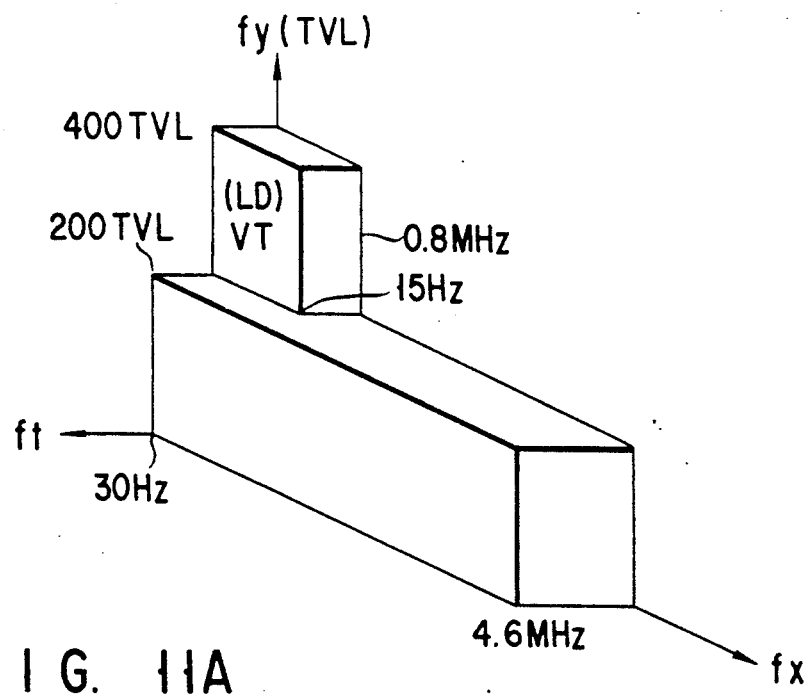
FIGS. 11A and 11B show three-dimensional spectra for explaining the operation of the apparatus of the present invention.
Figure 11B:
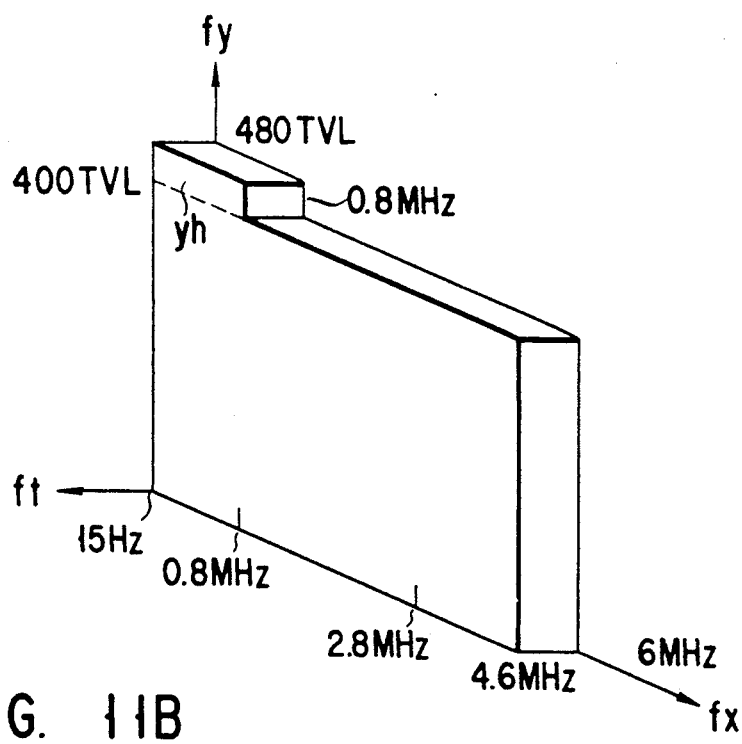

FIGS. 11A and 11B show the three-dimensional spectra, respectively, of a wide aspect signal after band limiting. The signal input to the 1/60-sec delay unit 107 has 4.6 MHz. bandwith in the horizontal direction, 480 TVL bandwith in the vertical spatial frequency, and 30 Hz bandwith in the temporal spatial frequency. FIG. 11A shows the spectrum of a wide aspect signal of a motion image, and FIG. 11B shows the spectrum of a wide aspect signal of a still image. The output of the adder 108 is band-limited to 15 Hz ($-3$ dB) or less along the temporal spatial frequency by the 1/60-sec delay unit 107 and itself.

In the spectrum of the signal of the motion image, a vertical high-frequency component (200 [television scanning lines per picture height] or more) is limited to 0.8 MHz in the horizontal band and to 15 Hz or less along the temporal spatial frequency. This is because the 1/60-sec delay unit 111 and the adder 108 realize double frame scanning and the V-HPF 113 and the H-LPF 114 extract the vertical and horizontal high-frequency components, respectively. A signal obtained by the H-LPF 114 is a vertical high image quality component. However, this system does not transmit the vertical high signal directly but transmits it as an LD signal. When a transmission signal is in the motion image mode, a signal within this band is replaced by the LD signal generated by the LD generator 122. The adder 15 adds the vertical high signal to the signal of 200 [television sacanning lines per picture height] or less extracted by the V-LPF 110.

When a transmission signal is in the still image mode, an output from the selector 112 is output through the mixer 116. A signal from the selector 112 is limited to 15 Hz or less along the temporal spatial frequency. The spectrum of the still image shows a Vh signal which is a vertical high-frequency component whose horizontal high-frequency is limited. However, the output from the mixer 116 is not subjected to this limitation and an actual limitation is performed for a vertical high-frequency component obtained by the subtracter 118. Namely, a vertical high-frequency component of 400 [television scanning lines per picture height] or more is converted to a Vh signal as it passes through the vertical shifter 119 and the H-LPF 140.

As described above, in this system, the wide aspect signal is band-limited and compressed in the vertical direction so as to maintain the compatibility with the existing television system, and the motion mode vertical high signal is converted to the LD signal. The LD and Vh signals are selectively output in accordance with whether the signal is of the motion or still image mode by the operation of the motion detector 123 and the mixer 124, subjected to horizontal band limitation, compression, and rearrangement, multiplexed on the upper and lower black bar portions, and transmitted. A degradation in image quality does not occur on the decoder side even if this band limitation is performed. The reason for this will be described.

Figure 12A:
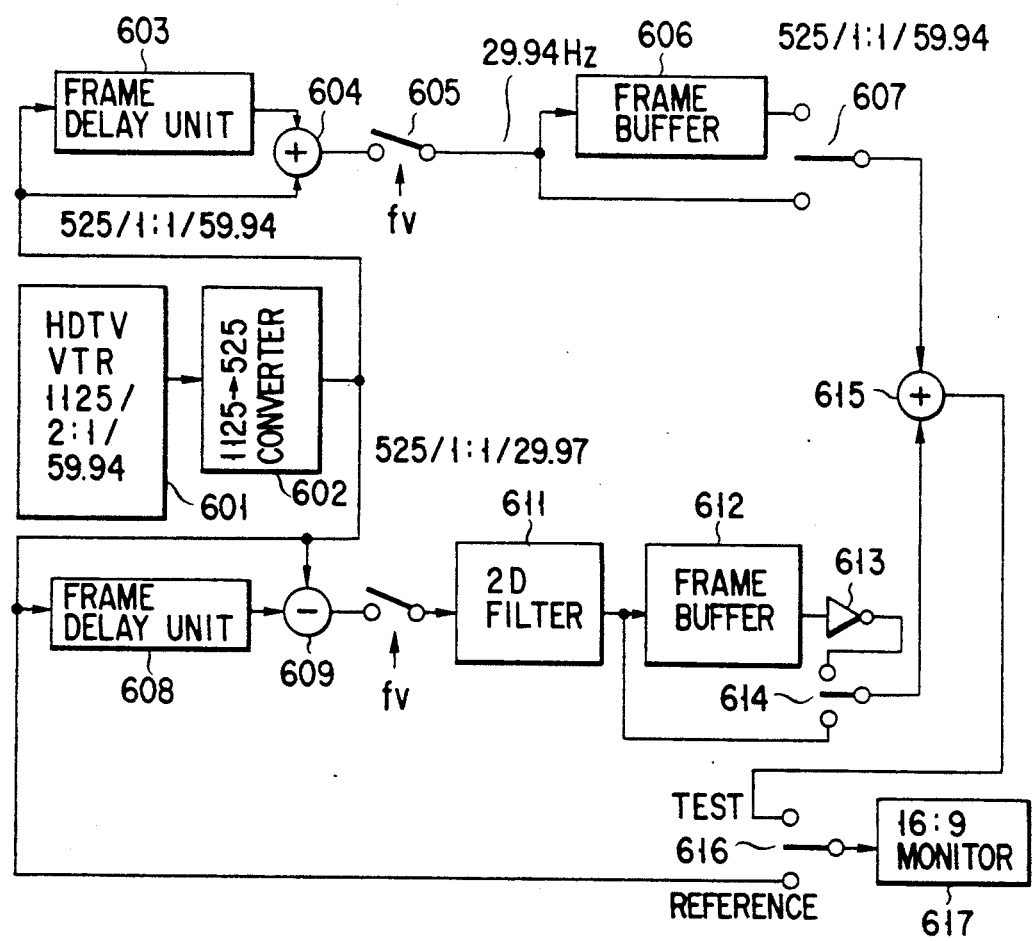
FIG. 12A is a block diagram of a testing unit for evaluating a signal transmitted within the band of the apparatus of the present invention.

FIG. 12A is a block diagram of a testing system for subjective evaluation. The system uses a high-definition VTR 601 as the signal supply. A high-definition signal (having 1125 scanning lines) output from the high-definition VTR 601 is converted to a sequential scanning signal having 525 scanning lines (480 [television scanning lines per picture height]) by a converter 602. The progressive scanning signal having 525 scanning lines is subjected to interframe addition by a frame delay unit 603 and an adder 604 and subjected to interframe subtraction by a frame delay unit 608 and a subtracter 609. The respective resultant signals are field-interlaced by switches 605 and 610, respectively. An output from the switch 605 is subjected to frame interpolation by a frame buffer 606 and a switch 607 so as to be converted to the original progressive scanning signal having 480 [television scanning lines per picture height] and input to an adder 615. An output from the switch 610 passes through a two-dimensional filter 611, is subjected to frame interpolation by a frame buffer 612, an inverter 613, and a switch 614 so as to be converted to the original progressive scanning signal having 480 [television scanning lines per picture height], and input to the adder 615. A monitor 617 can receive, via a switch 616, a composite signal of the signal which has been subjected to interframe addition and the signal which has been subjected to interframe subtraction, as a signal which has been subjected to band limiting. The monitor 617 can also receive, via the switch 616, a signal which has not been subjected to interframe processing as a reference signal. Accordingly, the monitor 617 can perform evaluation by comparing the image quality of the band-limited signal and that of the reference signal.

Figure 12B:
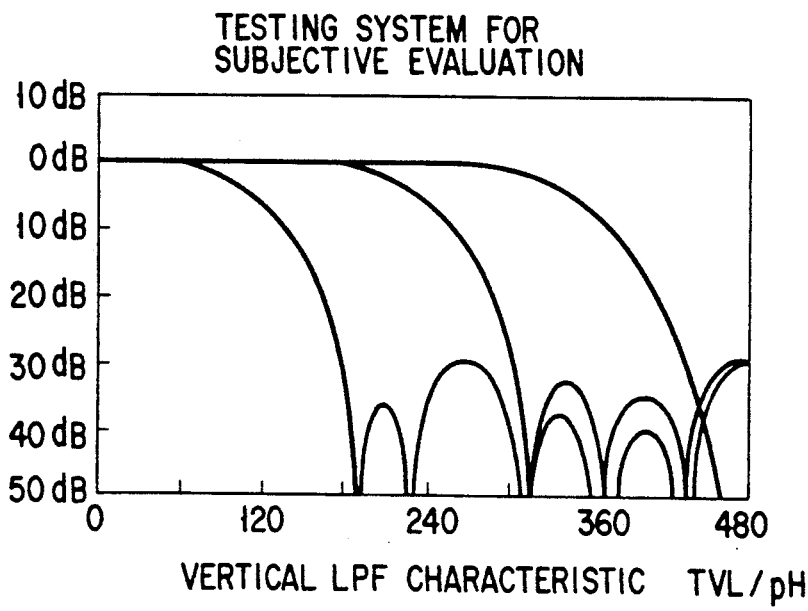
FIG. 12B is a graph showing characteristic curves of a two-dimensional filter used in the testing unit.
Figure 13:
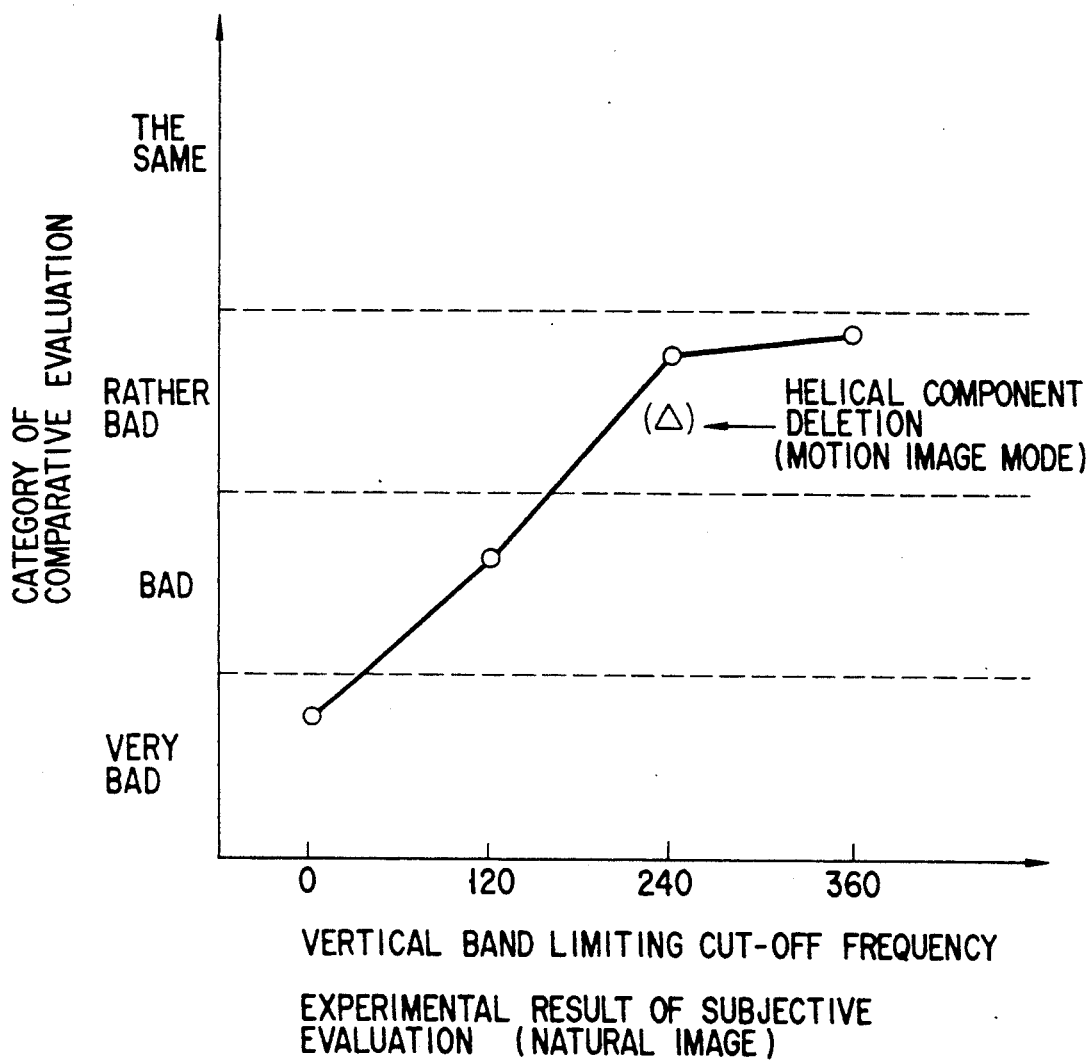
FIG. 13 is a graph showing the evaluation result of the transmission signal obtained by observing a monitor screen of the test unit of FIG. 12A.

An interframe difference component can be band-limited by the two-dimensional filter 611. FIG. 12B shows the characteristics of the two-dimensional filter 611. An image obtained when the vertical band limiting characteristic of the filter 611 is switched among 360 [television scanning lines per picture height], 240 [television scanning lines per picture height], 120 [television scanning lines per picture height], and 0 [television scanning lines per picture heiqht] was compared with an image of the reference signal which has not been subjected to interframe processing. Evaluations as shown in FIG. 13 were obtained. The evaluation category includes the same, rather bad, bad, and very bad. It is apparent from FIG. 13 that when an interframe-processed signal is band-limited to have 240 [television scanning lines per picture height] or less, the evaluation is almost the same as that for a case in which the interframe-processed signal is band-limited to have 360 [television scanning lines per picture height] or less.

Accordingly, in this system, if a wide aspect signal is subjected to band limiting like the spectra shown in FIGS. 11A and 11B, when the signal is reproduced by the decoder, substantially no degradation occurs in image quality.

Figure 14:
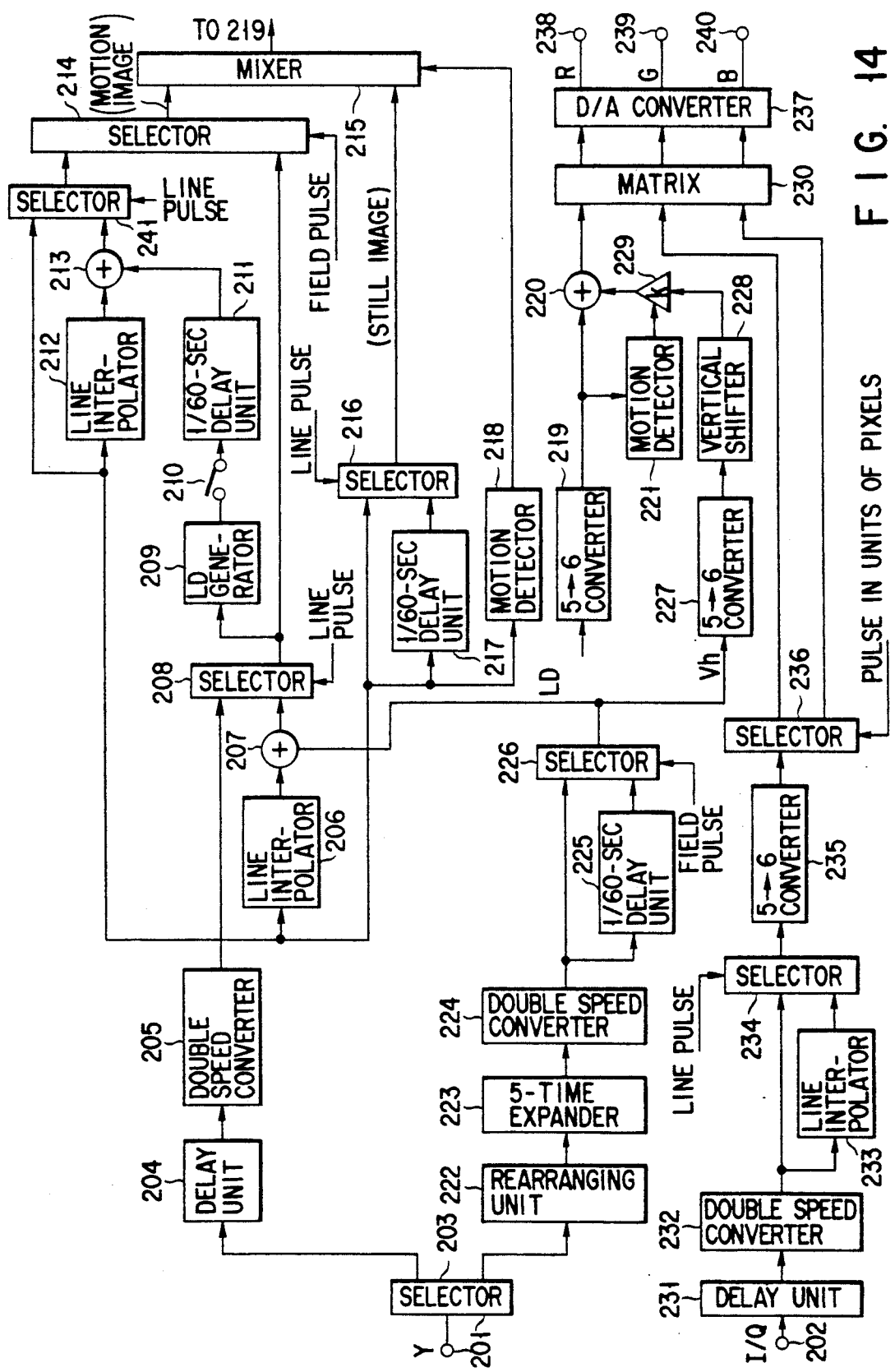
FIG. 14 is a block diagram showing a decoder according to the embodiment in FIG. 8.

FIG. 14 shows a decoder for decoding a signal, processed and transmitted in the above manner, to an original wide aspect signal.

A luminance signal Y and an I/Q signal are input at input terminals 201 and 202, respectively. The luminance signal Y is input to a selector 203 and divided into a center portion signal and upper and lower black bar portion signals. The center portion signal is input to a double speed converter 205 via a delay unit 204 to be double-speed converted. Processing for converting an interlace signal to a progressive scanning signal is performed. An output from the double speed converter 205 is input to a line interpolator 206, a selector 208, a line interpolator 212, and a selector 241. The output from the double speed converter 205 is also input to a 1/60-sec delay unit 217, a selector 216, and a motion detector 218.

The upper and lower black bar portion signals separated by the selector 203 are input to a rearranging unit 222 and converted to a state before arranging by the transmission side. The rearranged signals are time-expanded by a 5-time expander 223 to the original time length. A double speed converter 224 converts the interlaced signal to a progressive scanning signal. An output signal from the double speed converter 224 is input to a 1/60-sec delay unit 225 and a selector 226. The selector 226 is switched every field and outputs a decoded LD signal such that it can be used twice. This is because the transmission side transmits the LD signal every other field, as described with reference to FIG. 10B. When the signal is of the motion image mode, the LD signal can be obtained by the selector 226; when the still image mode, the Vh signal can be obtained.

A processing flow for a case in which the center panel displays a still image will be described.

An output from the double speed converter 205 is 1-field delayed by the 1/60-sec delay unit 217 and input to the selector 216. Since the selector 216 selectively outputs the direct and delayed signals in units of lines, the output of the selector 216 is a progressive scanning signal and input to a mixer 215. The output from the double speed converter 205 is also input to the motion detector 218. When a motion detection signal detected by the motion detector 218 represents a still image, the mixer 215 increases the gain of or selects the signal from the selector 216 and supplies it to a 5→6 converter 219. The 5→6 converter 219 expands an input signal 6/5 times in the vertical direction. When the center portion is a still image, the signal multiplexed on the upper and lower black bar portions is a Vh signal. The Vh signal is expanded 6/5 times in the vertical direction by a 5→6 converter 227 and input to a vertical shifter 228 to be shifted to the original frequency band (400 to 480 [television scanning lines per picture height] band). The shifted signal is gaincontrolled by a coefficient unit 229 and input to an adder 220. The gain of the coefficient unit 229 is controlled on the basis of a signal from a motion detector 221 which detects the motion of the image by using an output from the 5→6 converter 219. As a result, a signal of a still image having 480 [television scanning lines per picture height] can be obtained by the adder 220.

A processing flow for a case in which the center portion is a motion image will be described.

In this case, note that the LD signal is transmitted every other field. When an interpolation signal is generated from an interlaced signal, the vertical position of the interpolation signal changes between the first and second fields. A timing for adding the LD signal to the signal having the original scanning lines must be adjusted in the first and second fields by considering this fact.

The LD signal from the selector 226 is input to an adder 207 and added to an interpolation signal (an interpolation signal of the first field) output from the line interpolator 206. This corresponds to compensation for the lacking components of the interpolated scanning lines generated by line interpolation. An output (interpolated scanning lines) from the adder 207 is supplied to the selector 208 which is selectively operated by a line pulse. Therefore, the selector 208 alternately selects the direct signal the signal having the original scanning lines) from the double speed converter 205 and the interpolation signal from the adder 207 and outputs the selected signal as a progressive scanning signal. The progressive scanning signal is supplied to a selector 214 and an LD generator 209. The selector 214 is controlled to select the direct progressive scanning signal supplied from the selector 208 in the first field.

The output from the double speed converter 205 is also supplied to the line interpolator 212 and the selector 241. An output from the line interpolator 212 is input to an adder 213 to be added to the LD signal for the second field, and the sum is input to the selector 241. The selector 241 alternately selects the two inputs in units of lines to output a progressive scanning signal to the selector 214. The selector 214 selects the progressive scanning signal from the selector 241 in the second field.

The LD signal for the second field is generated in the following manner. The LD generator 209 generates the LD signal again by using the progressive scanning signal from the selector 208. The LD signal from the LD generator 209 is time-adjusted (delayed from the first to second field) in the second field by a 1/60-sec delay unit 211 via a switch 210 (for the sake of safety; not necessarily provided) which is turned on every line, and input to the adder 213.

An output from the selector 214 is input to the mixer 215. The mixer 215 performs gain control and selection of the output signals from the selectors 214 and 216 in accordance with the motion detection signal from the motion detector 218 and outputs the selected signal. An output from the mixer 215 is input to the 5→6 converter 219 to be extended 6/5 times in the vertical direction and input to the adder 220 and the motion detector 221. If the image is a motion image, the gain of the coefficient unit 229 is 0, and a motion image signal from the 5→6 converter 219 is directly output from the adder 220.

An output from the adder 220 is input to a matrix circuit 230. The matrix circuit 230 mixes the decoded luminance signal with the I and Q signals.

Reproduction of the I and Q signals will be described.

The I/Q signal is input to a delay unit 231, delayed to be synchronized with the luminance signal Y, and input to a double speed converter 232. The double speed converter 232 performs double speed conversion of the I/Q signal and converts the signal to a progressive scanning signal. An output from the double speed converter 232 is input to a line interpolator 233 and a selector 234. The selector 234 alternately selects an interpolation signal from the line interpolator 233 and a direct signal from the double speed converter 232 in units of lines and outputs a progressive scanning signal. The progressive scanning signal is input to a 5→6 converter 235 to be subjected to scanning line conversion of 6/5 times, and expanded in the vertical direction. A conversion output is input to a selector 236 which performs selection in units of pixels (in units of I and Q signals) and divided into I and Q signals, and the divided I and Q signals are input to the matrix circuit 230. The matrix circuit 230 generates R, G, and B signals of a wide aspect ratio by using the input signals and supplies them to a D/A converter 237. The analog R, G, and B signals are output at output terminals 238, 239, and 240, respectively.

Figure 15:
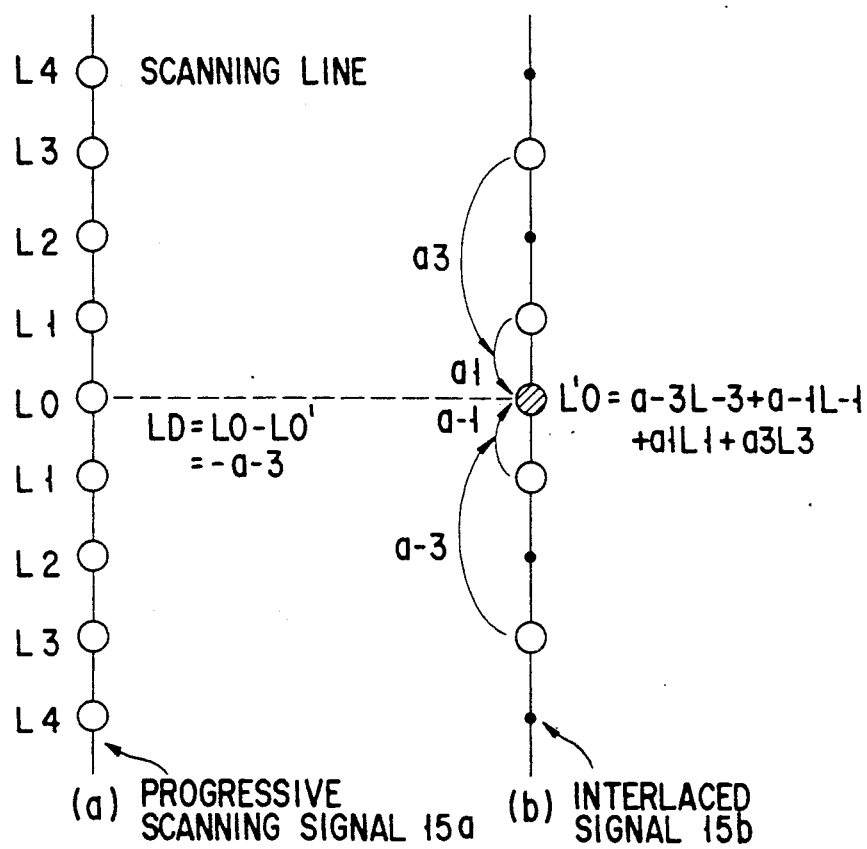
FIG. 15 is a scanning line explanatory diagram for explaining the operation of the apparatus of the present invention.

FIG. 15 is a diagram for explaining processing of an LD signal as a characteristic feature of the system described above.

In this system, a progressive scanning signal 15a is converted to an interlaced signal 15b and transmitted. On the reception side, an interpolated scanning line (the line with a hatched portion) is generated by using the interlace signal 15b. However, the interpolated scanning line is not always equal to a corresponding scanning line L0 of the transmission side. Thus, a difference signal between an interpolated scanning line L0' and the original scanning line L0, i.e., the LD signal is transmitted as an auxiliary signal, and the interpolated scanning lines are added on the reception side.

That is, the interpolated scanning line L0' is generated by weighting a plurality of vertical scanning lines in the following predetermined manner:

$$L0' = a_{-3}L_{-3} + a_{-1}L_{-1} + a_1L_3 + a_3L_3 \quad (1)$$

where $a_n$ is a weighting coefficient and $L_n$ is a scanning line to be transmitted. Therefore, a difference occurs between the transmission-side scanning line L0 and the interpolated scanning line L0'. The difference is the LD signal:

$$LD = L0 - L0' \quad (2)$$

A substitution of equation (1) into equation (2) yields:

$$LD = -a_{-3}L_{-3} - a_{-1}L_{-1} + L0 - a_1L_1 - a_3L_3 \quad (3)$$

The LD signal is transmitted by utilizing the upper and lower black bar portions. When the LD signal is reproduced on the reception side and added to the interpolated scanning line L0', the original scanning line L0 can be correctly reproduced.

FIG. 16A shows a practical arrangement of the LD generators 122 and 209, and FIG. 16B shows a practical arrangement of the line interpolators 206, 212, and 233. In the LD generator, a signal input to an input terminal 401 is progressively delayed by line delay units 402 to 407. The signal at the input terminal 401 and output signals from the line delay units 403, 405, and 407 are input to an adder 416 via weighting coefficient units 411, 412, 414, and 415, respectively. The adder 416 subtracts outputs of the coefficient units 411, 412 414, and 415 from an output of a coefficient unit 413 and outputs the result at an output terminal 417 as the LD signal. The LD generator serves as a vertical filter. For example, when $$a_{-1} = a_1 = (1/12) \text{ and}$$

$$a_{-3} = a_3 = (7/12)$$

are set as interpolation coefficients, the LD generator serves as a vertical high-pass filter (V-HPF). Since the vertical high-frequency component is band-limited to 15 Hz, as shown in FIG. 11A, it need not be transmitted every 1/60 sec., and the motion image can be reproduced on the reception side if the vertical high-frequency component is transmitted every 1/30 sec. This transmission is not unnatural, as indicated by the experimental result described above.

The line interpolator progressively delays an input signal at an input terminal 421 by line delay units 423 to 428. A signal at the input terminal 421 and output signals from the line delay units 424, 426, and 428 are input to an adder 435 via coefficient units 431, 432, 433, and 434, respectively. Then, a line-interpolated scanning line is obtained by the adder 435 and output at an output terminal 436.

As described above, the LD signal (signal important for motion image reproduction) to be multiplexed on the upper and lower black bar portions only need be transmitted every 1/30 sec., which is half the conventional transmission amount. As a result, the transmission capacity of the entire image signal has a margin. The LD signal reproduced from the upper and lower black bar portions compensates for the interpolated scanning line of the first field on the decoder side. When compensation for the interpolated scanning line is to be performed in the second field, the LD signal is generated again from the progressive scanning signal of the first field and synchronized, thereby performing compensation. This operation will be described in more detail.

Figure 17:
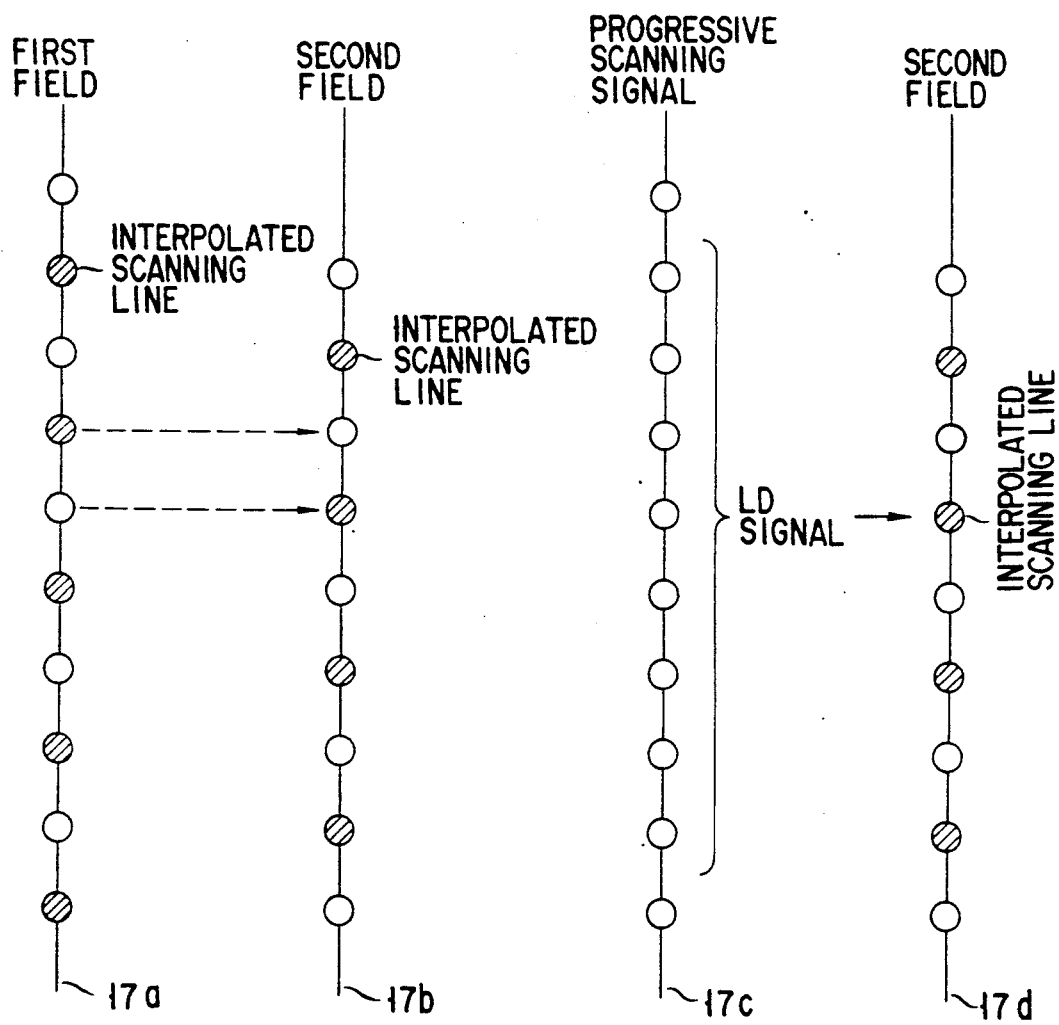
FIG. 17 contains diagrams for explaining scanning line interpolation and compensation of the scanning line interpolator of FIG. 16B.

When an interpolated scanning line (hatched portion in FIG. 17) is generated by interpolating an interlaced signal, the first and second fields are vertically shifted from each other by one line, as indicated by first and second field signals 17a and 17b in FIG. 17. For this reason, a signal obtained by rearranging the LD signal reproduced from the upper and lower black bar portions cannot be directly used for compensating for the interpolated scanning lines of the first and second fields. If the LD signal reproduced from the upper and lower black bar portions corresponds to, e.g., the first field, the LD signal corresponding to the second field is reproduced from a first-field progressive scanning signal 17c reproduced on the decoder side, and this LD signal is used for compensating for a second-field signal 17d. The LD generator 209, the switch 210, and the 1/60-sec delay unit 211 in FIG. 14 realize this processing.

The decoder shown in FIG. 14 is not limited to this arrangement.

Figure 18:
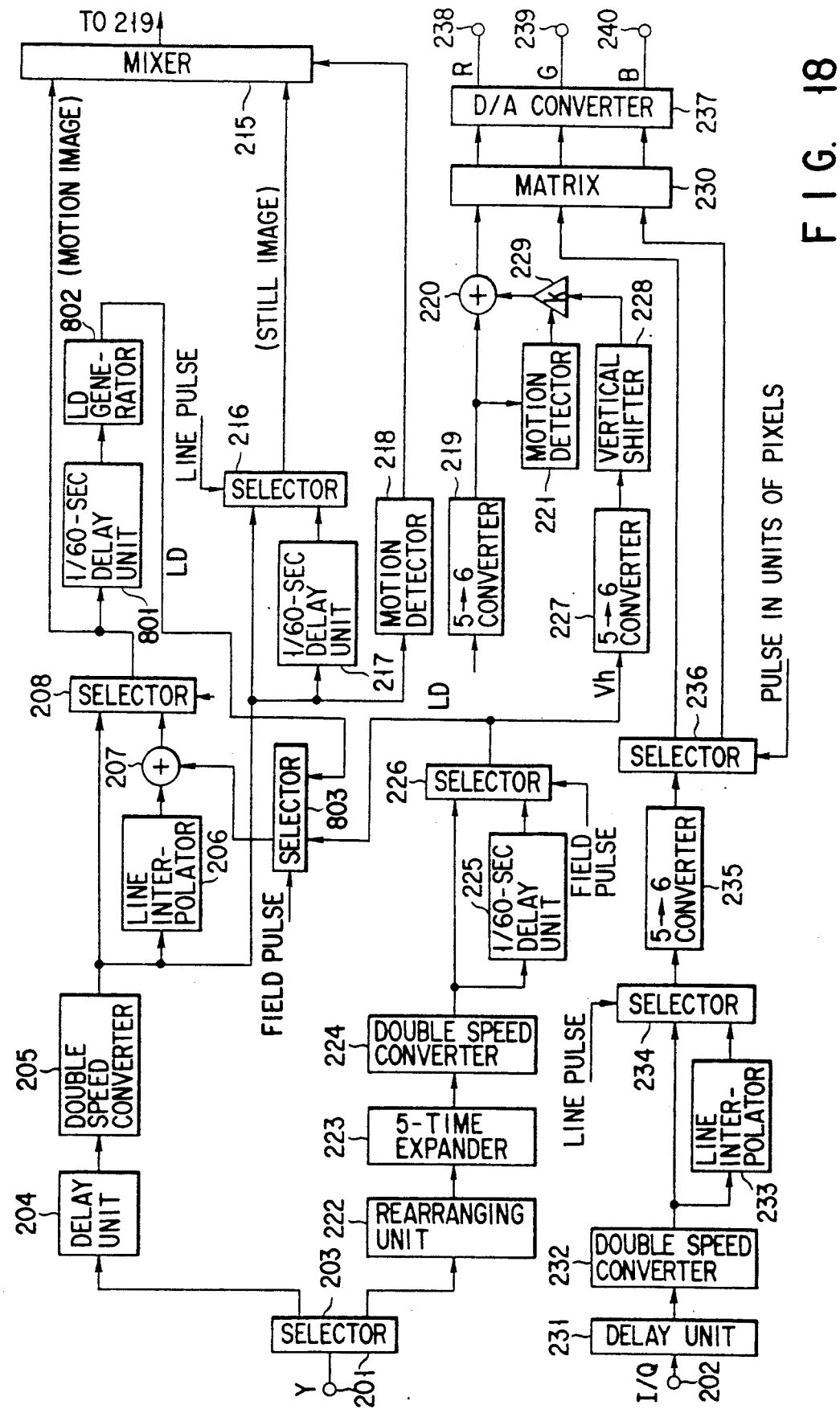
FIG. 18 is a block diagram of a decoder according to another embodiment of the apparatus of the present invention.

FIG. 18 shows another embodiment of the decoder. The decoder of FIG. 18 is different from that of FIG. 14 in the line for compensating for the second-field interpolated scanning line by using the LD signal. An output form a selector 208 is directly input to a mixer 215 and also to an LD generator 802 via a 1/60-sec delay unit 801. An LD signal generated by the LD generator 802 is input to a selector 803. The selector 803 also receives the first-field LD signal supplied from the selector 226. An output of the selector 803 is input to an adder 207. In the first field, the selector 803 selects an LD signal from a selector 226 and supplies it to the adder 207; in the second field, it selects an LD signal from the LD generator 802 and supplies it to the adder 207.

This embodiment is more simplified than the embodiment described above. Since other portions of the second embodiment are identical to those of the first embodiment, they are denoted by the same reference numerals, and a detailed description thereof is omitted.

Furthermore, in this system, the LD and Vh signals are switched or gain-controlled in accordance with whether an image is a motion image or a still image, and the selected signal is multiplexed on the upper and lower black bar portions by the encoder. That is, the mixer 124 is controlled by the motion detection signal from the motion detector 123. In this case, the motion detection signal is imparted with a characteristic to have an intermediate region for selecting nothing between a region for instructing selection of the LD signal and a region for instructing selection of the Vh signal.

Figure 19A:
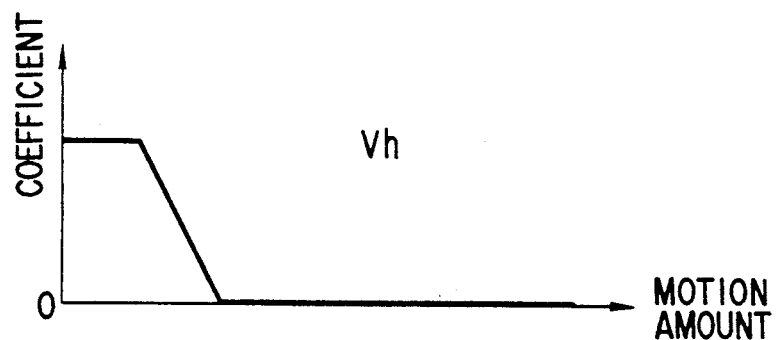
FIGS. 19A to 19C are graphs of detected motions for explaining the operation of the motion detector of the apparatus of the present invention.
Figure 19B:
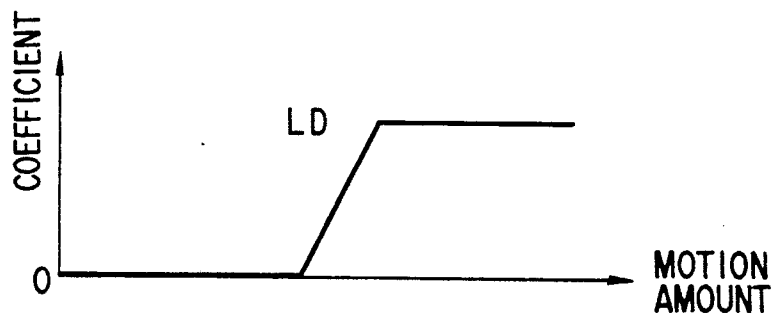
Figure 19C:
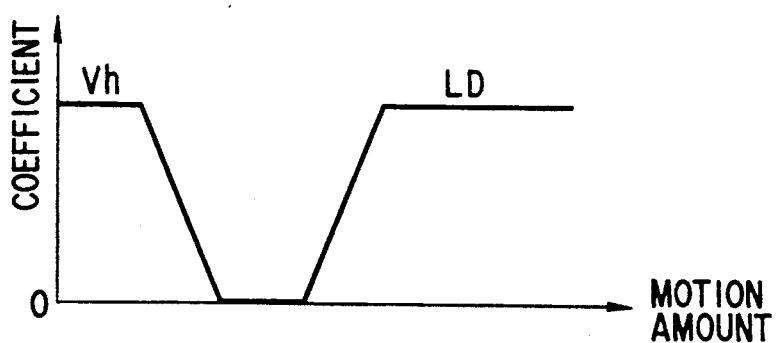

FIG. 19A shows a coefficient characteristic imparted to the Vh signal when the motion detection signal represents a still image. When a motion amount exceeds a predetermined amount Ml, the coefficient becomes 0, that is, the Vh signal is not output from the mixer 124. FIG. 19B shows a coefficient characteristic imparted to the LD signal when the motion detection signal represents a motion image. When the motion amount exceeds a predetermined amount M2, a coefficient is imparted to the LD signal, and when the motion amount is M2 or less, the coefficient is 0. A region in which nothing is output is defined between M1 and M2, as shown in FIG. 19C. This is because the natures of the Vh and LD signals are completely different. Without this region, the edge of an image may be disturbed at the boundary between the motion and still images. This factor causing image quality degradation is removed in this system. This principle similarly applies to the decoder. The relationship between the motion detectors 218 and 221 of the decoder shown in FIG. 14 is identical to those indicated in FIGS. 19A and 19B.

As has been described above, with this system, the LD signal for compensating for a line interpolation signal is transmitted by limiting the temporal spatial frequency band of the vertical high-frequency component to 15 Hz in advance. Therefore, the transmission amount of the auxiliary signal (LD signal) necessary for motion image reproduction can be decreased to half the conventional amount, and substantially no degradation in image quality is caused by band limiting. Since the transmission amount of the auxiliary signal is decreased, the system can be suitably applied to a wide aspect television system of the intermediate scheme which has smallcapacity upper and lower black bar portions.

When a motion image is to be transmitted, the system transmits an LD signal. This system employs motion adaptive processing. Thus, when a still image is to be transmitted, the system transmits a vertical high-frequency component having 400 [television scanning lines per picture height] or more by multiplexing it on the upper and lower black bar portions. Accordingly, an image with a natural motion can be obtained in the motion image mode, and a high-resolution image can be obtained in the still image mode, resulting in high-quality image transmission and reproduction as a whole.

On the decoder side, the LD signal is regenerated from the image signal, which has been subjected to progressive scanning conversion, by using the LD signal. The LD signal is transmitted in units of 1/30 sec. As the LD signal is regenerated, compensation for a progressive scanning signal in units of 1/60 sec. can be performed, and an image of the progressive scanning signal of the same quality as that on the transmission side can be obtained.

As has been described above, this system can greatly reduce the band of the multiplexed signal and enables transmission and reproduction of a high-definition image. For example, when this system is applied to a system of the intermediate scheme which converts a signal having 480 [television scanning lines per picture height] to a signal having 400 [television scanning lines per picture height] and transmits the converted signal, the LD signal may be transmitted in units of 200 scanning lines/5=40 scanning lines every 1/30 sec., and transmission can be performed by half the region of the 40 scanning lines on each of the upper and lower black bar portions. Accordingly, the remaining regions of a total of 40 scanning lines can be utilized as transmission regions for information processed in accordance with the side panel scheme. In other words, a side panel signal corresponding to 400 scanning lines can be transmitted by multiplexing it in the regions of 40 scanning lines on upper and lower black bar portions.

When this system is applied to an intermediate scheme which converts a signal having 480 [television scanning lines per picture height] to a signal having 420 [television scanning lines per picture height] and transmits the converted signal, the LD signal has 210/5=42 scanning lines, and this LD signal may be transmitted every 1/30 sec. Accordingly, this signal can be sufficiently multiplexed on the regions of the upper and lower black bar portions each having 30 scanning lines, and information on the side panel signal can be multiplexed on the remaining regions of 18 scanning lines and transmitted.

Furthermore, in this system, since compression and expansion in the vertical direction are not performed in units of blocks, block distortion which conventionally occurs in the existing television receiver does not occur at all.

As has been described above according to this embodiment, an augment signal for high image quality reproduction can be sufficiently transmitted and reproduced without causing an interference in the receiver of the existing television system by improving the letter box scheme employed by the intermediate scheme.

What is claimed is:

1. A multiplexed signal transmitting apparatus for converting a first image signal for a screen wider than a screen obtained by an existing television signal to a signal which can be reproduced by a receiver of an existing television system and transmitting the converted signal, comprising:

band width limiting means for obtaining a second image signal by limiting a band of at least a vertical high-frequency component of the first image signal along the temporal spatial frequency;

compensation signal generating means for obtaining a difference signal (LD signal) between an interpolated scanning line, obtained by performing interpolation by using a plurality of vertical scanning lines of the second image signal of interlace scan, and a scanning line actually constituting the second image signal and corresponding to the interpolated scanning line;

converting means for obtaining a third image signal by conversion of the second image signal such that a first region becomes an image display portion and a second region becomes a non-image portion when the second image signal is compressed in the vertical direction and an image of the compressed signal is matched to a screen of the receiver of the existing television system; and transmitting means for multiplexing the LD signal from said compensation signal generating means on the non-image portion of the third image signal obtained by said converting means and transmitting the multiplexed signal in order to use the multiplexed signal for compensating for an interpolated scanning line of a receiver.

2. An apparatus according to claim 1, wherein said band width limiting means comprises:

first still image signal generating means for generating a first still image signal by obtaining an interframe sum of the first image signal so as to have a band width ½ that of the first image signal along the temporal spatial frequency;

second still image signal generating means for generating a second still image signal by using a one-frame first still image signal twice so as to have a band width ½ that of the first still image signal along the temporal spatial frequency;

mixing means for receiving the second still and a motion image signals and mixing or selecting the second still and the motion image signals, thereby obtaining the second image signal; and motion detecting means for detecting an image motion of the first image signal and controlling said mixing means such that a ratio of the motion image signal is increased when a motion amount is larger than a predetermined level and such that a ratio of the second still image signal is increased when the motion amount is smaller than the predetermined level.

3. An apparatus according to claim 1, wherein said compensation signal generating means further comprises:

vertical high-frequency component extracting means for extracting a vertical high-frequency component (Vh signal) of the second image signal; and Vh signal output means for outputting the LD signal when the second image signal represents a motion image and outputting the Vh signal when the second image signal represents a still image.

4. An apparatus according to claim 1, wherein said transmitting means comprises means for multiplexing the LD signal on the third image signal every other field.

5. A multiplexed signal transmitting apparatus which, when compressing a first image signal used for a screen wider than that obtained by an existing television signal and having a band width of 30 Hz along the temporal spatial frequency and 480 TVL in the vertical direction, compresses the first image signal in the vertical direction and converts and transmits the compressed image signal such that, when the compressed image signal is reproduced by a receiver of an existing television system, upper and lower black bar portions and a center portion therebetween appear on a screen of the receiver of the existing television system and most of a pattern of the first image signal appears on the center portion, comprising:

second image signal output means for outputting a second image signal band-limited to 15 Hz, substantially 4.6 MHz, and 400 TVL along the temporal spatial frequency, in the horizontal spatial frequency, and in the vertical spatial frequency, respectively, with respect to the first image signal;

third image signal output means for outputting a third image signal band-limited to, substantially 4.6 MHz, and 200 TVL along the temporal spatial frequency, in the horizontal spatial frequency, and in the vertical spatial frequency, respectively, with respect to the first image special, adding means for extracting a component having a band width of 200 to 400 TVL and 0 to 0.8 MHz in the vertical and horizontal spatial frequency, respectively, from the second image signal, adding the extracted component to the third image signal, and outputting a fourth image signal;

compressing means for compressing the fourth and second image signals 5/6 times in the vertical direction and outputting a fifth image signal;

LD signal obtaining means for obtaining a motion image compensation signal (LD signal) as a difference between a line interpolated scanning line formed by using an original scanning line of the fifth image signal obtained by said compressing means and the original scanning line corresponding to the line interpolated scanning line;

Vh signal containing means for extracting a component having a band of not less than 400 TVL and not more than 0.8 MHz in the vertical and horizontal directions, respectively, from the second image signal, frequency-shifting the band of the extracted component in the vertical spatial frequency to 0 to 80 TVL, and compressing the band-shifted component in the vertical spatial frequency, thereby obtaining a still image compensation signal (Vh signal); and multiplexing means for time-compressing the LD signal in the horizontal direction and multiplexing the time-compressed LD signal on every other field of the upper and lower black bar portions when the fourth image signal is output, and time-compressing the Vh signal in the horizontal direction and multiplexing the time-compressed Vh signal on every other field of the upper and lower black bar portions when the second image signal is output.

6. A receiving apparatus for receiving a transmitted multiplexed signal obtained by converting a first image signal for a screen wider than a screen obtained by an existing television signal to a signal which can be reproduced by a receiver of an existing television system, comprising:

dividing means for receiving the multiplexed signal and dividing the multiplexed signal to a center portion signal and upper and lower black bar portion signal of the screen, the multiplexed signal being converted such that a compressed second image signal has a center portion as an image display portion and upper and lower black bar portions as non-image portions when a vertical high-frequency component of the first image signal is band-limited along the temporal spatial frequency by a transmission side to obtain a second image signal, the second image signal is converted by compression in the vertical spatial frequency, and the compressed signal is matched to the screen of the receiver of the existing television system, the upper and lower black bar portions being multiplexed with a difference signal (LD signal) as a difference between an interpolated scanning line, obtained by performing interpolation by using a plurality of vertical scanning lines of the second image signal of interlace scan, and a scanning line actually constituting the second image signal and corresponding to the interpolated scanning line, compensation signal reproducing means for reproducing the LD signal from the upper and lower black bar portion signals obtained by said dividing means;

double speed converting means for double-speed converting a center portion signal obtained by said dividing means;

converting means for alternately selecting a direct scanning line output from said double speed converting means and an interpolated scanning line formed by using the direct scanning line and outputting a progressive scanning signal;

expanding means for expanding a signal obtained by said converting means in the vertical direction by an amount corresponding to that compressed on the transmission side, thereby obtaining an expanded signal; and compensation signal synthesizing means for adding the LD signal reproduced by said compensation signal reproducing means to the interpolated scanning line.

7. An apparatus according to claim 5, wherein a vertical high-frequency component (Vh signal) concerning an obtained still image is at least frequency-shifted, compressed in the vertical direction, and multiplexed on the upper and lower black bar portions by band-limiting the second image signal in the vertical spatial frequency.

8. An apparatus according to claim 6, wherein said compensation signal reproducing means further includes Vh signal reproducing means for reproducing a Vh signal in addition to the LD signal, and
said compensation signal synthesizing means further includes synthesizing means for synthesizing the reproduced Vh signal with an expansion signal expanded by said expanding means in accordance with a control signal from an image motion detecting means.

* * * * *